(12) United States Patent
Murray et al.

(10) Patent No.: US 10,859,363 B2
(45) Date of Patent: Dec. 8, 2020

(54) TAPE RULE ASSEMBLY WITH LINEAR OPTICAL ENCODER FOR SENSING HUMAN-READABLE GRADUATIONS OF LENGTH

(71) Applicant: Stanley Black & Decker, Inc., New Britain, CT (US)

(72) Inventors: Michael J. Murray, Vernon, CT (US); Aliaksei Chernyshou, Farmington, CT (US); Gabriel A. Haboubi, Towson, MD (US)

(73) Assignee: Stanley Black & Decker, Inc., New Britain, CT (US)

( * ) Notice: Subject to any disclaimer, the term of this patent is extended or adjusted under 35 U.S.C. 154(b) by 331 days.

(21) Appl. No.: 15/717,297

(22) Filed: Sep. 27, 2017

(65) Prior Publication Data

US 2019/0094001 A1   Mar. 28, 2019

(51) Int. Cl.
| | |
|---|---|
| *G01B 3/1084* | (2020.01) |
| *G01D 5/26* | (2006.01) |
| *G01B 3/1061* | (2020.01) |
| *G01B 3/1003* | (2020.01) |
| *G01B 3/1094* | (2020.01) |

(52) U.S. Cl.
CPC ......... *G01B 3/1084* (2013.01); *G01B 3/1003* (2020.01); *G01B 3/1061* (2013.01); *G01D 5/262* (2013.01); *G01B 3/1094* (2020.01); *G01B 2003/1087* (2013.01)

(58) Field of Classification Search
CPC .......... G01B 3/1084; G01B 2003/1094; G01B 2003/1087; G01B 3/1082; G01B 3/1061; G01D 5/262
See application file for complete search history.

(56) References Cited

U.S. PATENT DOCUMENTS

| | | | |
|---|---|---|---|
| 2,992,487 A | 7/1961 | Miller | |
| 3,223,845 A * | 12/1965 | Wales | G01C 3/08 |
| | | | 356/617 |
| 3,512,006 A * | 5/1970 | Haller | G01D 5/34715 |
| | | | 250/231.11 |
| 3,672,597 A | 6/1972 | Williamson | |
| 4,009,377 A * | 2/1977 | Elms | G01D 5/2495 |
| | | | 702/158 |
| 4,047,025 A | 9/1977 | Lemelson | |

(Continued)

FOREIGN PATENT DOCUMENTS

| | | |
|---|---|---|
| DE | 2846915 A1 | 5/1980 |
| DE | 10117193 A1 | 10/2002 |

(Continued)

*Primary Examiner* — Nimeshkumar D Patel
*Assistant Examiner* — Tania Coursen
(74) *Attorney, Agent, or Firm* — Gabriel A. Haboubi

(57) ABSTRACT

A tape rule assembly includes a linear optical encoder for sensing human-readable graduations of length disposed on a surface of a tape, without requiring any other machine-readable indicia to be present on the tape. The optical encoder includes two optical sensors disposed in a sensor holder pivotably disposed in the tape rule housing and configured to be displaced relative to one another in the housing along both the "x" axis and the "z" axis, a set of intersecting "x", "y" and "z" axes being defined relative to a tape exit in the tape rule housing.

19 Claims, 12 Drawing Sheets

(56) References Cited

U.S. PATENT DOCUMENTS

| | | | |
|---|---|---|---|
| 4,143,267 A | 3/1979 | Johnson et al. | |
| 4,161,781 A | 7/1979 | Hildebrandt et al. | |
| 4,164,816 A | 8/1979 | Bergkvist | |
| 4,195,348 A * | 3/1980 | Kakutani | G01B 3/1084 33/763 |
| 4,213,035 A | 7/1980 | Washizuka et al. | |
| 4,242,574 A | 12/1980 | Grant | |
| 4,366,623 A * | 1/1983 | Bergqvist | G01B 3/1084 33/763 |
| 4,427,883 A * | 1/1984 | Betensky | G01B 3/1061 250/237 G |
| 4,465,928 A | 8/1984 | Breslow | |
| 4,479,716 A * | 10/1984 | Nelle | G01D 5/36 250/237 G |
| 4,535,415 A | 8/1985 | Hird | |
| 4,551,847 A | 11/1985 | Caldwell | |
| 4,611,402 A | 9/1986 | Yamamoto et al. | |
| 4,621,256 A | 11/1986 | Rusk | |
| 4,658,134 A | 4/1987 | Okumura | |
| 4,689,485 A | 8/1987 | McMurtry | |
| 4,766,673 A | 8/1988 | Bolson | |
| 4,779,211 A | 10/1988 | March | |
| 4,782,448 A | 11/1988 | Milstein | |
| 4,890,392 A | 1/1990 | Komura et al. | |
| 4,896,280 A | 1/1990 | Phillips | |
| 5,027,526 A | 7/1991 | Crane | |
| 5,035,064 A | 7/1991 | Care | |
| 5,060,394 A | 10/1991 | Lincoln et al. | |
| 5,062,214 A * | 11/1991 | Gustafsson | G01D 5/34792 33/706 |
| 5,079,851 A | 1/1992 | Sill | |
| 5,091,643 A | 2/1992 | Okutani et al. | |
| 5,129,725 A | 7/1992 | Ishizuka et al. | |
| 5,136,285 A | 8/1992 | Okuyama | |
| 5,142,793 A * | 9/1992 | Crane | G01B 3/1061 33/763 |
| 5,208,767 A | 5/1993 | George-Kelso et al. | |
| 5,294,793 A | 3/1994 | Schwaiger et al. | |
| 5,406,715 A * | 4/1995 | Koizumi | G01B 3/1004 33/706 |
| 5,426,863 A | 6/1995 | Biggel | |
| 5,430,665 A | 7/1995 | Jin et al. | |
| 5,430,952 A | 7/1995 | Betts | |
| 5,433,014 A | 7/1995 | Falk et al. | |
| 5,459,942 A | 10/1995 | Hintz | |
| 5,485,682 A | 1/1996 | Le Breton | |
| 5,539,993 A | 7/1996 | Kilpinen et al. | |
| 5,560,119 A | 10/1996 | LeBreton | |
| 5,628,120 A * | 5/1997 | Sergenius | G01B 3/1082 33/708 |
| 5,691,923 A * | 11/1997 | Adler | G01B 3/1061 33/706 |
| 5,825,307 A | 10/1998 | Titus et al. | |
| 5,852,434 A | 12/1998 | Sekendur | |
| 5,894,678 A | 4/1999 | Masreliez et al. | |
| 5,983,514 A * | 11/1999 | Lindsey | G01B 3/1061 33/760 |
| 6,054,851 A | 4/2000 | Masreliez et al. | |
| 6,199,292 B1 | 3/2001 | Ebeling | |
| 6,360,447 B1 * | 3/2002 | Foley | B07C 1/16 209/604 |
| 6,412,187 B1 | 7/2002 | Sasaki et al. | |
| 6,643,947 B2 * | 11/2003 | Murray | G01B 3/1003 33/755 |
| 6,658,755 B2 | 12/2003 | Arlinsky | |
| 6,742,953 B2 | 6/2004 | Burden et al. | |
| 6,868,620 B2 | 3/2005 | Sanoner | |
| 6,892,468 B2 | 5/2005 | Murray | |
| 6,898,865 B2 * | 5/2005 | Rodi | G01B 7/003 33/706 |
| 6,898,866 B2 | 5/2005 | Weeks | |
| 6,914,235 B2 | 7/2005 | Benner et al. | |
| 6,927,704 B1 | 8/2005 | Rouleau | |
| 6,928,744 B2 | 8/2005 | Schweighoffer et al. | |
| 6,976,317 B2 * | 12/2005 | Rodi | G01D 5/2492 33/706 |
| 7,103,988 B2 | 9/2006 | Sanoner | |
| 7,146,743 B2 | 12/2006 | Oura | |
| 7,178,259 B2 | 2/2007 | Williams et al. | |
| 7,185,445 B2 | 3/2007 | Rhead | |
| 7,272,893 B2 | 9/2007 | Williams et al. | |
| 7,353,619 B2 | 4/2008 | Gibbons et al. | |
| 7,363,723 B1 | 4/2008 | Peterson | |
| 7,401,416 B2 | 7/2008 | Brooks | |
| 7,546,694 B1 | 6/2009 | Jeong | |
| 7,549,235 B2 | 6/2009 | Alders | |
| 7,773,070 B2 | 8/2010 | Trisnadi et al. | |
| 7,900,369 B2 | 3/2011 | Albrecht | |
| 7,903,262 B2 | 3/2011 | Wagner et al. | |
| 7,961,909 B2 | 6/2011 | Mandella et al. | |
| 7,963,046 B2 | 6/2011 | Fratti et al. | |
| 7,992,317 B1 | 8/2011 | Cannata | |
| 8,094,139 B2 | 1/2012 | Bergström et al. | |
| 8,356,419 B2 * | 1/2013 | Lord | G01D 7/00 33/756 |
| 8,373,110 B2 | 2/2013 | Fang et al. | |
| 8,408,746 B1 | 4/2013 | Lauer | |
| 8,421,446 B2 * | 4/2013 | Straubinger | G01D 5/2225 324/207.15 |
| 8,537,263 B2 | 9/2013 | Reigneau | |
| 8,552,362 B2 | 10/2013 | Fang et al. | |
| 8,553,935 B2 | 10/2013 | Mandella et al. | |
| 8,732,974 B2 | 5/2014 | Jayanetti et al. | |
| 8,739,426 B1 | 6/2014 | Freed et al. | |
| 8,793,890 B2 * | 8/2014 | Delneo | G01B 3/1041 33/769 |
| 8,827,722 B1 | 9/2014 | Cannata | |
| 8,863,399 B2 | 10/2014 | Steele et al. | |
| 8,897,494 B2 | 11/2014 | Mandella et al. | |
| 8,898,921 B1 | 12/2014 | Adorno | |
| 8,966,778 B2 | 3/2015 | Rubin | |
| 9,041,385 B2 * | 5/2015 | Kirste | G01D 5/2455 324/207.22 |
| 9,188,426 B2 | 11/2015 | Safranski | |
| 9,235,934 B2 | 1/2016 | Mandella et al. | |
| 10,309,805 B2 * | 6/2019 | Burkhardt | G01D 5/2497 |
| 2002/0088136 A1 | 7/2002 | Tseng | |
| 2004/0068885 A1 | 4/2004 | Rubin | |
| 2008/0072446 A1 | 3/2008 | Hu | |
| 2008/0191021 A1 | 8/2008 | Lapstun et al. | |
| 2008/0276477 A1 | 11/2008 | Albrecht | |
| 2009/0009360 A1 | 1/2009 | Flannigan et al. | |
| 2009/0013552 A1 * | 1/2009 | Affa | G01D 5/264 33/706 |
| 2009/0090016 A1 | 4/2009 | Roach | |
| 2010/0163500 A1 | 7/2010 | Megow | |
| 2012/0274564 A1 | 11/2012 | Cronjaeger et al. | |
| 2014/0123512 A1 | 5/2014 | Linker et al. | |
| 2014/0170360 A1 | 6/2014 | West et al. | |
| 2014/0250708 A1 | 9/2014 | Bauer | |
| 2014/0310970 A1 | 10/2014 | Unmann et al. | |
| 2015/0233703 A1 | 8/2015 | Martini et al. | |
| 2015/0308807 A1 | 10/2015 | Rhoden | |
| 2015/0330771 A1 | 11/2015 | Moffatt et al. | |
| 2015/0354935 A1 * | 12/2015 | Otake | G01B 3/1084 33/701 |
| 2016/0040971 A1 | 2/2016 | Hoge | |
| 2017/0082413 A1 | 3/2017 | Park et al. | |

FOREIGN PATENT DOCUMENTS

| | | |
|---|---|---|
| DE | 10230471 A1 | 1/2004 |
| DE | 102005038526 A1 | 3/2006 |
| DE | 112011105373 T5 | 3/2014 |
| EP | 0474782 B1 | 1/1996 |
| EP | 1171750 B1 | 1/2005 |
| EP | 1022539 B1 | 11/2016 |
| FR | 2614982 A1 | 11/1988 |
| GB | 2102121 A | 1/1983 |
| GB | 2171508 A | 8/1986 |
| GB | 2236858 A1 | 4/1991 |
| JP | S6037814 U | 3/1985 |

(56) References Cited

FOREIGN PATENT DOCUMENTS

| | | | |
|---|---|---|---|
| KR | 20120059756 | A | 6/2012 |
| KR | 101748628 | B1 | 6/2017 |
| WO | 1987005995 | A1 | 10/1987 |
| WO | 2007012446 | A1 | 2/2007 |
| WO | 2008154611 | A2 | 12/2008 |

* cited by examiner

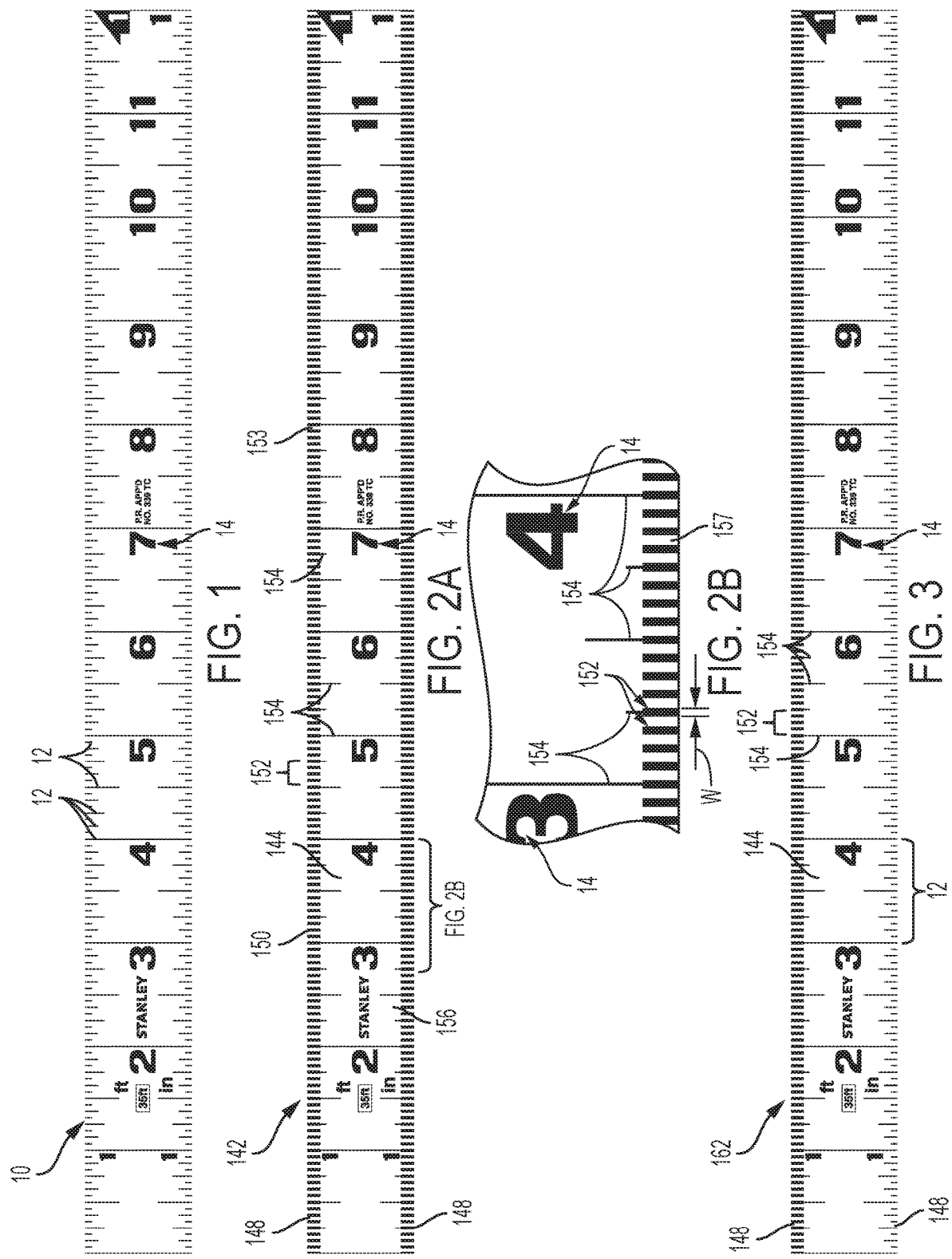

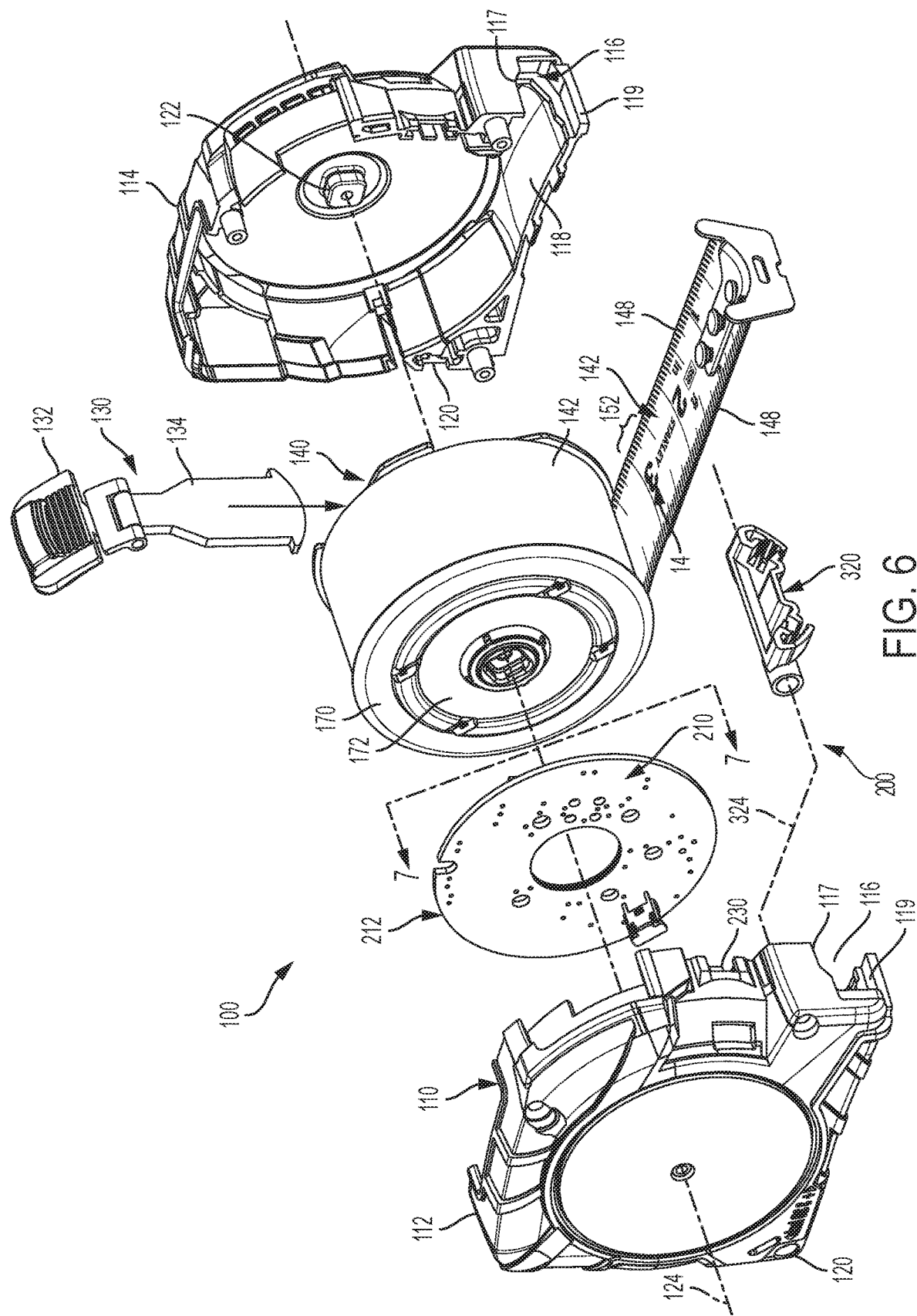

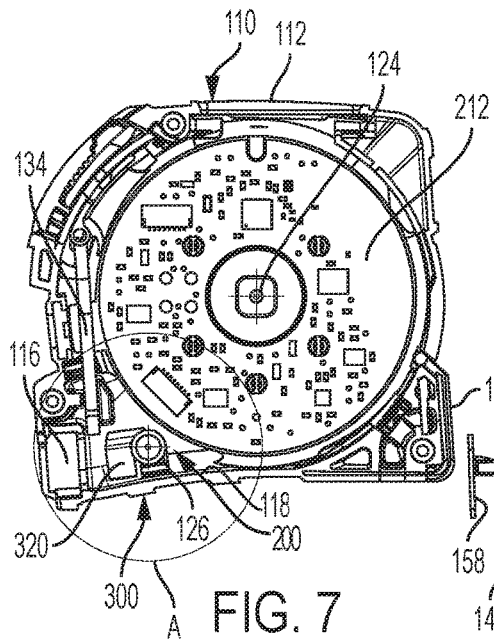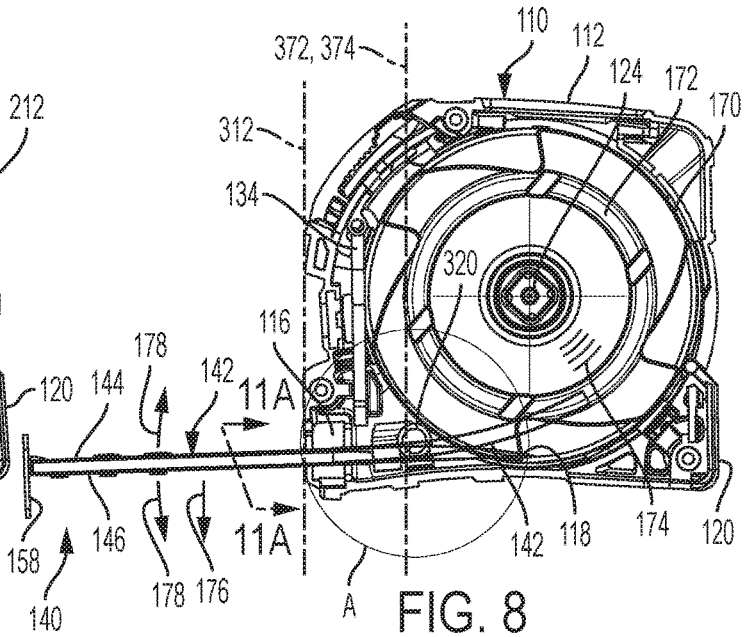
FIG. 7  FIG. 8
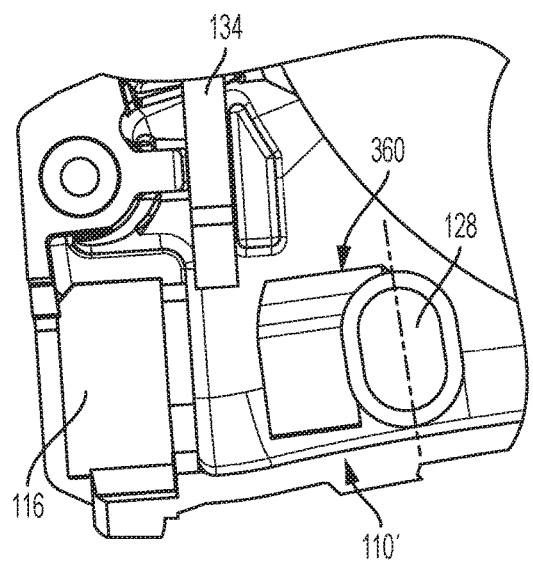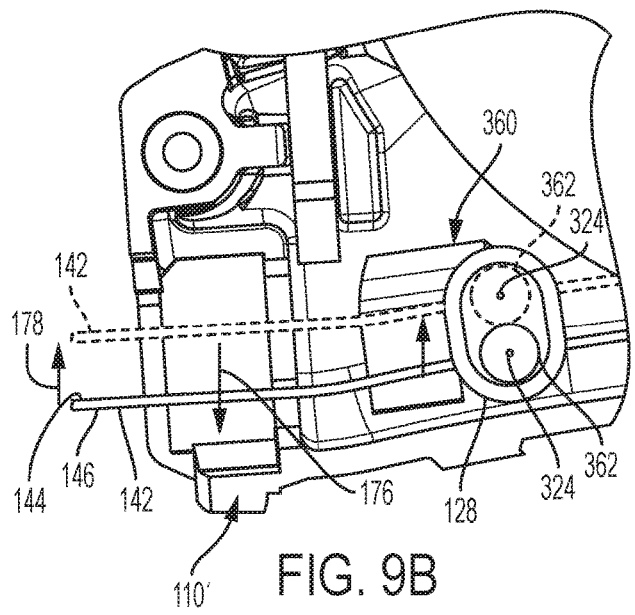
FIG. 9A  FIG. 9B

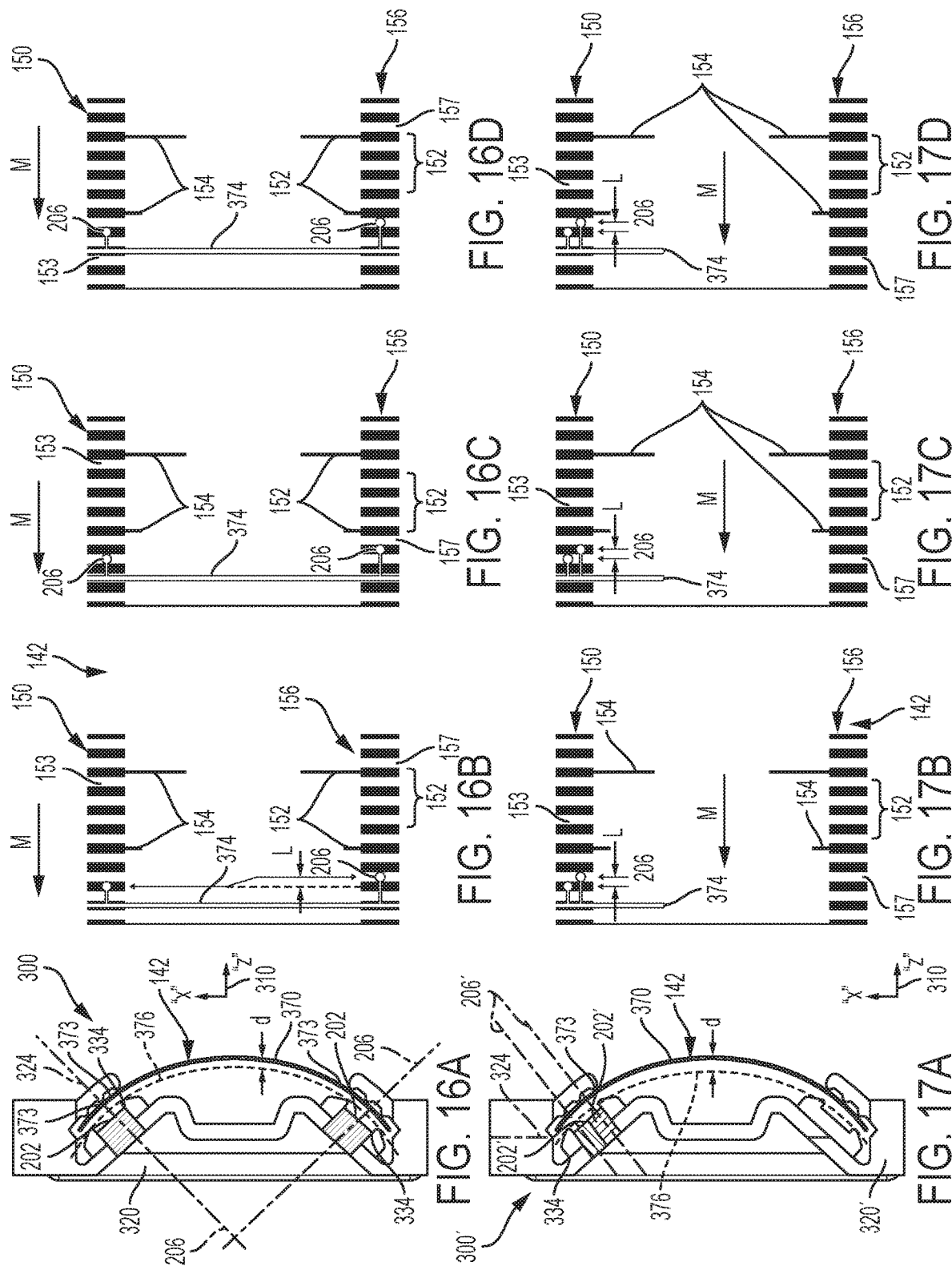

| EVENT TYPE | STATE OF OTHER PIN | RESULT |
|---|---|---|
| B RISING | A HIGH | INCREMENT |
| B RISING | A LOW | DECREMENT |
| A FALLING | B HIGH | INCREMENT |
| A FALLING | B LOW | DECREMENT |
| B FALLING | A LOW | INCREMENT |
| B FALLING | A HIGH | DECREMENT |
| A RISING | B LOW | INCREMENT |
| A RISING | B HIGH | DECREMENT |

TAPE RULE ASSEMBLY WITH LINEAR OPTICAL ENCODER FOR SENSING HUMAN-READABLE GRADUATIONS OF LENGTH

BACKGROUND OF THE INVENTION

1. Field of the Invention

The present invention relates to tape rules, and in particular to tape rules in which a linear optical encoder senses indicia on a tape to provide an indication of the amount of tape extended from the tape rule housing.

2. Description of the Related Art

As used herein, the phrase "tape rule" or "tape measure" includes any mechanism for storing and extending a length of tape or the like bearing graduations or other indicia of length. As used herein, "tape" includes tape, fabric, metal ("blade"), surveyor's tape, line, wire, chain, rope, and any other medium which may be wrapped around a spool or an axle.

Tape rules typically wrap a length of tape around an outer spool or "reel" so that a length of tape is extendable through a tape exit formed in the tape rule housing. The reel is rotatably disposed in the housing concentrically about a non-rotatable inner spool or spindle ("hub"), around which is wrapped several coils of a retraction spring. Examples of such tape rules are shown in U.S. Pat. No. 6,643,947, issued Nov. 11, 2003 to Murray, and in U.S. Pat. No. 8,793,890, issued Aug. 5, 2014 to Delneo et al., the entire disclosures of which patents are hereby incorporated herein by reference.

It is advantageous to provide such tape rules with systems for digitally displaying the length of tape extended from the tape rule housing so that the operator need not try to directly read the length from the graduations of length disposed on the tape. Such "human-readable graduations of length" are the familiar parallel lines on the top and/or bottom surface of the tape which are perpendicular to the tape's longitudinal edges, and which are accompanied by numerals representing British Imperial (or "Imperial") units of measurement and/or metric units. (See FIG. 1 of the Drawings, in which is shown a conventional tape 10 bearing human-readable graduations of length 12 and numerals 14.)

In contrast to tape with human-readable graduations of length are tapes specifically designed for conventional digital encoders, including linear optical encoders. Such linear optical encoders include various optical sensing systems which sense only machine-readable indicia, including, for example, barcodes and other arrays of alternating dark and light areas disposed on the tape surface, which indicia, by definition, are not "human-readable".

An example of a conventional system that reads "phase arrays" of alternating light and dark markings is illustrated in U.S. Pat. No. 4,161,781 issued Jul. 17, 1979 to Hildebrandt et al., the entire disclosure of which is hereby incorporated herein by reference. The phase array includes two parallel tracks of identical machine-readable light and dark markings disposed on the tape, which are offset from one another in the length direction of the tape to provide a means for the system to determine how much tape has passed under the optical sensors, and in which direction, so that a count of the markings can be either incremented or decremented. This information is then processed and the tape length is displayed in a digital display.

One of the advantages of a digital display of length is that the operator can see the length of the item being measured even under low-light conditions. Another is that a digital display is likely to provide a more accurate measurement of the tape bearing machine-readable indicia than would be obtained by the operator "eyeballing" human-readable tape graduations.

However, a disadvantage of conventional linear optical encoder systems arises from a marketing requirement that a human also be able to read the length of tape extended from the tape housing. Consequently, human-readable graduations of length must also be disposed on the tape. As may be imagined, at this point the surface of the tape has become cluttered with an unsightly mixture of markings. Furthermore if a human attempts to read the tape directly, the machine-readable indicia of length can detract from the human's ability to make accurate measurements.

An additional disadvantage associated with conventional linear optical encoder systems arises from the use of various systems to maintain the distances between the sensors and the surface of the tape within critical ranges. Such systems typically use complicated arrangements of rollers and springs to accommodate undulations in the tape as the tape is extended from the tape rule housing.

Therefore, in view of the above, there exists a need for a tape rule assembly using a linear optical encoder that senses human-readable graduations of length without also requiring that the tape include machine-readable indicia, as well as for a tape rule assembly that uses a simple, effective means for maintaining the distance between the sensors and the tape surface within the critical range, notwithstanding undulations in the tape as the tape is extended from the housing.

SUMMARY OF THE INVENTION

It has been discovered that, by configuring a tape rule assembly having a linear optical encoder so that two optical sensors which are displaced from one another in the tape rule housing along both the "x" and "z" axes, as defined below, "read" a tape bearing human-readable graduations of length, no machine-readable indicia need be disposed on the tape.

Accordingly, in an embodiment of a tape rule assembly embodying a linear optical encoder system according to the present invention, a length of tape having a surface bearing a plurality of human-readable graduations of length is extendable from a tape exit in the tape rule housing. A linear optical encoder disposed in the housing includes two optical sensors displaced in the housing along both the "x" and "z" axes relative to each other (a set of intersecting "x", "y" and "z" axes being defined relative to the housing tape exit). The two optical sensors are configured to sense the human-readable graduations.

In another embodiment, the "x" and "y" axes define a first plane generally transverse to the "z" axis. The tape has a contour in cross-section, the cross-section lying in a second plane parallel to the first plane. In addition to being displaced in the housing relative to each other, the two optical sensors are further displaced in the housing relative to the tape along a second contour lying in a third plane generally parallel to the second plane, with the second contour being substantially parallel to the first contour. The two optical sensors are also displaced in the housing relative to the tape along the "z" axis.

In a further embodiment, the contour of the tape proximate an end of at least one of the optical sensors includes a curved portion.

In yet another embodiment, the two optical sensors are displaced along the "z" axis relative to the tape about one-half the distance between the centerlines of adjacent graduations of length (or, for example, about 1/32 of an inch on a tape divided into sixteenths of an inch).

In still another embodiment, there are two pluralities of human-readable graduations of length disposed on the surface of the tape. One of the optical sensors is configured to sense one of the pluralities of human-readable graduations of length, and the other of the optical sensors is configured to sense the other of the pluralities of human-readable graduations of length.

In further embodiments, the human-readable graduations of length may be disposed adjacent one or both longitudinal edges of the tape. Also the outputs of the optical sensors are provided to comparators in the optical encoder whose respective outputs are then provided to a microcontroller (or microprocessor). The output of the microcontroller is provided to a digital display device, which may be disposed either on the tape rule itself, or may be located remotely, and which may then communicate with the tape rule either wirelessly or by wire. The digital display device displays the length of the tape extended from the housing, for example, in one of a set of Imperial units of measurement and/or a set of metric units of measurement.

In another embodiment, a method of measuring a length of tape extended from the housing includes extending a length of tape from the housing tape exit so that two optical sensors of a linear optical encoder spaced in the housing as set forth above sense the human-readable graduations of length as the tape is being extended, and then using the output of the optical sensors to provide a display of the length of tape extended from the housing.

In still another embodiment, a tape rule assembly according to the present invention uses a sensor holder configured according to the present invention, together with the radial uncoiling bias generated by confining a coil of tape in the housing, to maintain the critical distance from the optical sensors to the surface of the tape in an acceptable range, notwithstanding undulations in the tape as the tape is extended from the housing. This result is achieved without requiring rollers or springs to assist in urging the lower surface of the tape against the inner surface of the housing.

In yet another embodiment, as viewed from the tape exit and looking into the tape rule housing, two sets of tape-engaging members of the sensor holder form slots through which travel respective longitudinal edges of the tape as the tape is extended from the tape exit, so that the respective slots form a generally "V"-shaped array. The tape-engaging members include upper and lower tape-engaging members, the lower tape-engaging member defining a plurality of ridges engaging the lower surface of the tape to reduce friction between the tape and the lower tape-engaging members.

In short, the tape rule assembly according to the present invention uses a linear optical encoder that senses human-readable graduations of length, without requiring that machine-readable indicia also be present on the tape, and which uses a simple but effective means for maintaining the distance between the optical sensors and the tape surface within the critical range, notwithstanding undulations in the tape as the tape is extended from the housing.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the root terms "include" and/or "have", when used in this Specification, specify the presence of stated features, steps, operations, elements, and/or components, but do not preclude the presence or addition of at least one other feature, step, operation, element, component, and/or groups thereof.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus.

For definitional purposes and as used herein, "connected" or "attached" includes physically or electrically attached, whether directly or indirectly, fixedly or adjustably mounted, as, for example, "the optical sensors are operatively connected to a processor". Thus, unless otherwise specified, "connected" or "attached" is intended to embrace any operationally functional connection.

As used herein, "substantially," "generally," "slightly" and other words of degree are relative modifiers intended to indicate permissible variation from the characteristic so modified. It is not intended to be limited to the absolute value or characteristic which it modifies, but rather possessing more of the physical or functional characteristic than its opposite, and approaching or approximating such a physical or functional characteristic.

In the following description, reference is made to the accompanying Drawings, which are provided for illustration purposes as being representative of specific exemplary embodiments in which the invention may be practiced. Given the following description of the Specification and Drawings, the apparatus and methods should become evident to a person of ordinary skill in the art. Further areas of applicability of the present teachings will become apparent from the description provided herein. It is to be understood that other embodiments can be utilized, and that structural changes based on presently known structural and/or functional equivalents can be made, without departing from the spirit or scope of the invention.

BRIEF DESCRIPTION OF THE DRAWINGS

The above-mentioned and other features and advantages of this invention, and the manner of attaining them, will become more apparent and the invention will be better understood by reference to the following descriptions of embodiments of the invention taken in conjunction with the accompanying Drawings, wherein:

FIG. 1 is a plan view of a conventional length of tape bearing human-readable graduations of length.

FIG. 2A is a view, similar to that of FIG. 1, of an embodiment of a length of tape according to the present invention.

FIG. 2B is an enlarged detail view of a portion of the tape of FIG. 2A.

FIG. 3 is a view, similar to that of FIG. 2A, of another embodiment of a length of tape according to the present invention.

FIG. 6 is an exploded perspective view of the tape rule assembly of FIG. 4, with portions omitted for clarity.

FIG. 7 is a side elevational view of a portion of the tape rule assembly of FIG. 4, taken from line 7-7 of FIG. 6, and illustrating, in a circled region "A", an embodiment of a sensor holder, with portions omitted for clarity.

FIG. 8 is a view similar to that FIG. 7, but schematically illustrating the interaction of a length of tape with the sensor holder of FIG. 7.

FIG. 9A is an enlarged schematic elevational detail view of the circled region of FIG. 7, and illustrating another embodiment of the sensor holder, relative to a sensor holder aperture or slot formed in the housing.

FIG. 9B is a view similar to that of FIG. 9A, and schematically illustrating the interaction of a length of tape with the sensor holder of FIG. 9A.

FIG. 16A is a view similar to that of FIG. 11A, and illustrating the disposition of sensors within a sensor holder both along the "x" axis and along a contour parallel to the tape contour, of the tape rule assembly of FIG. 4.

FIGS. 16B-16D are progressive schematic detail views of an embodiment of the tape, illustrating the disposition of the sensors along the "z" axis relative to the tape for the sensor holder shown in FIG. 16A, with the arrows "M" indicating the direction of motion of the tape relative to the sensor holder of FIG. 16A as the tape is being extended.

FIG. 17A is a view similar to that of FIG. 16A, and illustrating the disposition of sensors within a sensor holder according to another embodiment of the tape rule assembly of FIG. 4.

FIGS. 17B-17D are views similar to those of FIGS. 16B-16D, and illustrating the disposition of sensors along the "z" axis relative to the tape for the sensor holder shown in FIG. 17A, the arrows "M" again indicating that the tape is being extended relative to the sensor holder of FIG. 17A.

Corresponding reference characters indicate corresponding parts throughout the several views. The exemplifications set out herein illustrate embodiments of the present invention, and such exemplifications are not to be construed as limiting the scope of the present invention in any manner.

DETAILED DESCRIPTION OF THE INVENTION

Figure 5:
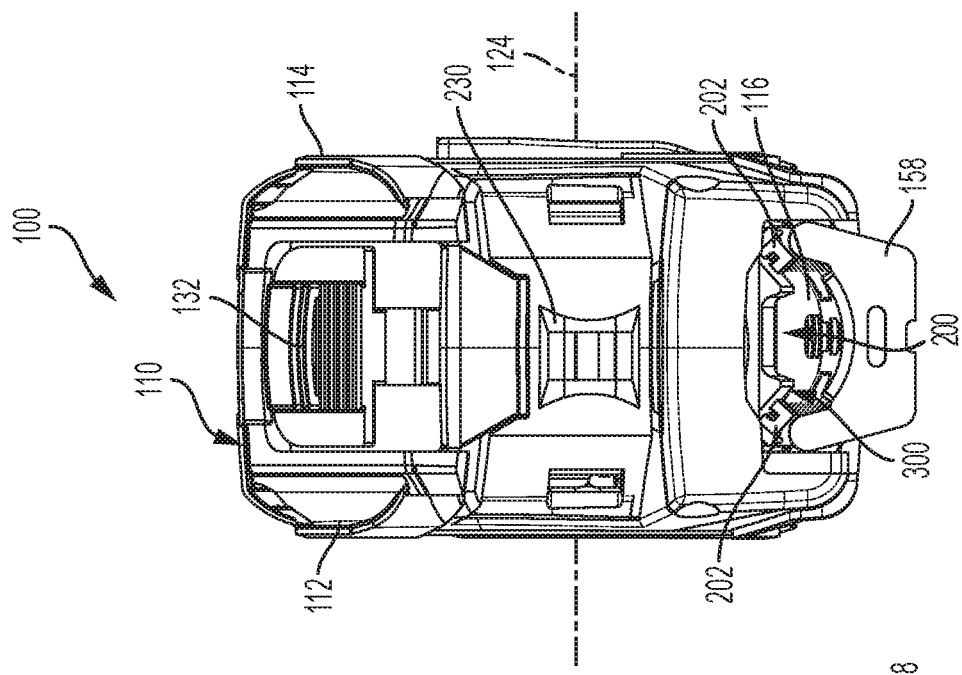
FIG. 5 is a front elevational view of the tape rule assembly of FIG. 4.

Apparatuses, systems, and methods embodying features, principles, and concepts of various exemplary embodiments of a tape rule assembly of the present invention will be described with reference to the Drawings. Referring to FIGS. 4-15B, an embodiment of the tape rule assembly is shown generally as 100, and includes the following elements: a housing 110, a tape system 140, a linear optical encoder system 200, and a sensor holder system 300.

Referring now to FIGS. 4-8, the housing 110 includes left and right housing halves 112, 114, which together define a tape exit 116. The tape exit 116 includes an upper tape exit member 117 and a lower tape exit member 119. As will be discussed later, upper and lower tape exit members 117, 119 may form the upper and lower limits to vertical movement of the tape relative to the tape exit 116. As shown in FIGS. 6-8, the housing 110 may further include a lower inner surface 118, and a rear bumper plate 120. The housing 110 also defines a hub mount 122 which may be disposed along a housing axis 124. Referring to FIG. 7, the housing 110 further defines a sensor holder mounting peg or boss 126. In another embodiment of the housing 110', shown in FIGS. 9A and 9B, the sensor holder mounting peg or boss 126 may be replaced by a sensor holder aperture or slot 128. All of the other elements of the housing 110' are the same as those of the housing 110. Finally, as shown, for example, in FIGS. 4-6, the housing 110 may include a slide lock 130, which in turn includes a slide lock actuator 132 and slide lock blade engager 134, the slide lock being operative to selectively clamp the tape or blade so that it can no longer be extended or retracted.

Figure 4:
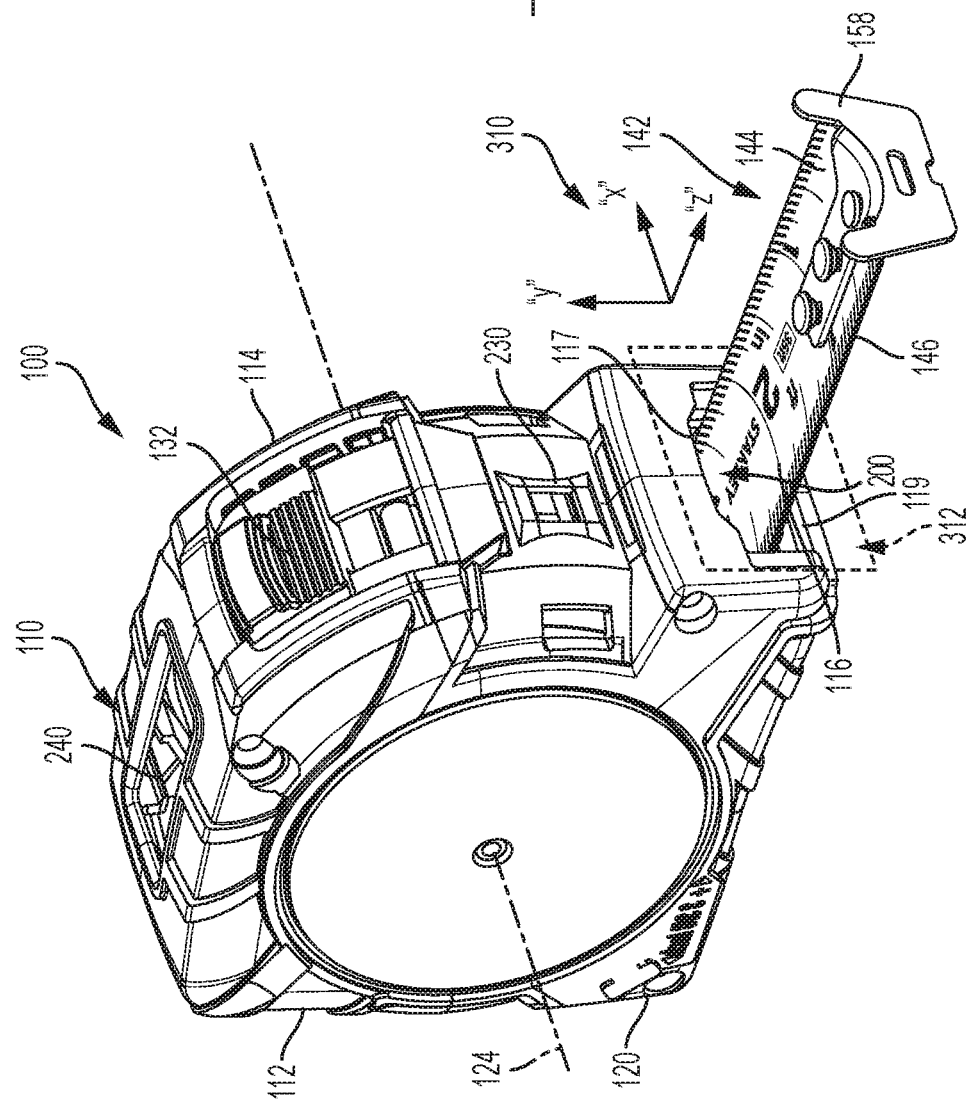
FIG. 4 is a perspective view of a tape rule assembly according to the present invention, from which a length of tape according to FIG. 2A has been extended.

The tape system 140, as shown in FIGS. 6 and 8, includes a length of tape 142, a reel 170, and a hub 172. The hub 172 is fixedly mounted on the hub mount 122, and the reel 170 is rotatably and concentrically disposed on the hub about the housing axis 124. A coiled spring 174 wound around the hub 172 may be configured to rotate the reel 170 about the hub 172 to thereby retract the tape 142. In an embodiment, the tape is formed from steel and is configured to exit the housing 110 with a generally concave cross-section (FIG. 4). In other embodiments, the tape may be formed from other suitable materials. Inasmuch as the tape 142 is wound tightly about the reel 170, the tape, upon being freed from its confinement in the coiled state on the reel, is thereby radially biased against the housing lower inner surface 118 ("radial uncoiling bias"). The force of the radial uncoiling bias is illustrated, for example, by arrow 176 in FIG. 8.

Referring now to FIGS. 2A, 2B, 4 and 8, the length of tape 142 includes an indicia or top surface 144 and a lower or bottom surface 146. The tape 142 also defines two parallel longitudinal edges 148. In an embodiment, a first plurality or track 150 of human-readable graduations of length may be disposed on the indicia surface 144 proximate one of the longitudinal edges 148, and a parallel second plurality or track 156 of human-readable graduations of length may be disposed on the indicia surface proximate the other of the longitudinal edges, together with appropriate numerals 14, which may be identical to the numerals shown in the conventional tape of FIG. 1. The human-readable graduations of length may include "thick" graduations 152 and "thin" graduations 154, with the thin graduations being disposed on the centerlines of respective thick graduations. In an embodiment, the thick and thin graduations of length 152, 154, respectively, may be formed using black infrared-sensitive ink against a white or yellow background. In other embodiments, the thick and thin graduations of length 152, 154, respectively, may be formed using any other suitable colors and marking substances, and the background may be any suitable color. In either event, however, in order for the linear optical encoder system 200 to "read" the human-readable graduations of length, there needs to be a clear contrast between the "dark" graduations of length and the "light" spaces in between graduations. Accordingly, a first plurality of "light" spaces 153 may separate adjacent thick graduations 152 of the first plurality 150 of human-readable graduations of length, and a second plurality of "light" spaces 157 may separate adjacent thick graduations 152 of the second plurality 156 of human-readable graduations of length. As shown in FIG. 4, the tape 142 may include a blade hook 158.

In the embodiment of the tape 142 as shown in FIGS. 2A and 2B, the centerlines of adjacent thick graduations of length 152 may be separated by a sixteenth of an inch in accordance with the Imperial units of measurement. In other embodiments, graduations of length according to the metric system may be used. In still further embodiments, a combination of Imperial and metric units may be used, on the indicia surface 144 and/or on the bottom surface 146 of the tape 142, and the graduations of length may be separated into greater or smaller fractions. To minimize costs, the thicknesses of respective thick graduations 152 may be selected so that less expensive optical sensors having lower sensitivity ratings may be used in the tape rule assembly 10. In an embodiment, the width of respective thick graduations of length 152 may be about $\frac{1}{32}$ of an inch. However, it should be noted that, although the linear optical encoder system 200 "reads" thick graduations 152 of the tape 142, 162 shown in FIGS. 2A and 3, respectively, in other embodiments, the linear optical encoder system may read the thin graduations of length 154, which are about $\frac{1}{64}$ of an inch in width, and even tape in which all of the graduations of length are "thin", such as are used on a conventional length of tape 10 as shown in FIG. 1, and which are also about $\frac{1}{64}$ of an inch in width. In that event, it would be necessary to use optical sensors with greater sensitivity ratings.

The key is that the tape rule assembly 10 is able to read human graduations of length of different thicknesses, even down to the thickness of graduations of length used in conventional tapes.

In other embodiments, a single plurality of thick graduations of length 152 may be disposed proximate one of the longitudinal edges 148, as is illustrated, for example, in the length of tape 162 shown in FIG. 3. In further embodiments, as is also illustrated in FIG. 3, a plurality of thin graduations of length, such as are used in the tape 10 shown in FIG. 1, may be disposed proximate the other of the longitudinal edges 148. In still other embodiments, more than two pluralities or "tracks" 150, 156 of thick graduations of length 152 may be disposed on one or both of the surfaces 144, 146 of the tape 142. In other embodiments, one or more of the tracks 150, 156 may extend over only a portion of the length of tape 142.

Although the tape rule assembly 10 may be configured to read tapes bearing "thick" and/or "thin" graduations of length 152, 154, respectively, solely for ease of description, the phrase "graduations of length", when used in connection with the tape 142, will refer to an embodiment using "thick" graduations 152. Furthermore, notwithstanding the varieties of dispositions of thick and/or thin graduations of length 152, 154, respectively, as set forth above, all are "human-readable", as can be seen by inspection of FIGS. 2A and 3.

An embodiment of the linear optical encoder system 200 will be briefly described to provide a foundation for a description of the structure and functionality of the sensor holder system 300. The linear optical encoder system 200 will be described in greater detail thereafter.

The linear optical encoder system 200, as shown in FIGS. 4-7, 11A and 11B, 16A-17D, and 18-23B, may include two optical sensors 202, each having an optical sensor end 204, and each defining an optical sensor axis 206. In other embodiments, the linear optical encoder system 200 may include greater or fewer than two optical sensors 202. In an embodiment, the optical sensors 202 may be, for example, QRE1113 Reflective Object Sensors, by Fairchild/ON Semiconductor. In other embodiments, the optical sensors 202 may have greater or lesser sensitivity ratings, and be smaller or larger, than those used in the embodiment of the tape rule assembly 10 described above. The optical sensors 202 are operatively connected to circuitry 210 which, pursuant to a mode selected by a mode switch 230 (FIGS. 4 and 5), may cause various information about the length(s) measured by the tape rule assembly 10 to be displayed in a digital display device 240. In an embodiment, the digital display device 240 is disposed directly on the housing 110, as is also shown in FIGS. 4 and 5. In other embodiments, the digital display device 240 may be located remotely from the tape rule assembly 10, and may communicate with the tape rule assembly either wirelessly (such as via Bluetooth® technology, of Bluetooth SIG), or via a hard-wired cable.

The sensor holder system 300 may be configured as a multi-function element of the tape rule assembly 100. One function may be to orient as closely as possible the optical sensor axes 206 so that they are perpendicular to the parallel tracks of human-readable graduations of length 152 disposed on, for example, the indicia surface 144 of the tape 142. Such an orientation will enable almost all of the infrared light emitted by the optical sensors 202 and reflected from the indicia surface 144 to be collected by the optical sensors 202. A second function may be to eliminate the conventional requirement that two identical parallel tracks of machine-readable indicia be disposed on, and be displaced relative to one another in the length direction of, the tape 142. One way in which this result may be achieved by the tape rule assembly 100 is by displacing the optical sensors 202 from one another in the housing, via the sensor holder system 300, along both the "x" axis and the "z" axis (the intersecting Cartesian coordinates 310 of the "x", "y" and "z" axes being defined relative to the tape exit 116 of the housing 110, as shown, for example, in FIG. 4). A third function of the sensor holder system 300 may be to maintain a distance "d" between the optical sensor ends 204 and respective tracks of human-readable graduations of length 152 within a critical range "R" of distances dictated by the respective specifications of particular optical sensors 302. For an embodiment of the optical sensors 202, the range "R" may be from about 0.5 mm to about 1.2 mm. The respective ranges "R" associated with other embodiments may be different.

Referring initially to FIGS. 10A-10G, the sensor holder system 300 includes a sensor holder or housing member 320, which includes a sensor holder body 322, which in turn defines a pivot axis 324. The sensor holder body 322 includes a pivot portion 326, tubular end portions 328, an upper portion 330, and a lower portion 332. As will be seen later, the upper portion 330 provides a mounting surface for a flexible circuit board, or "flex board". The lower portion 332 includes sensor mounts 334 for mounting the optical sensors 202 so that their respective sensor axes 206 are oriented perpendicular to the parallel tracks 150, 156 of human-readable graduations of length 152 disposed on the indicia surface 144 of the tape 142. The upper portions of the sensor mounts 334 also define respective upper tape-engaging members 336, as may be seen particularly in FIG. 10C. The lower portions of the sensor mounts 334 define respective lower tape-engaging members 338, which may include respective pluralities of ridges 340 to reduce friction between the tape 142 and the sensor holder 320. Still referring to FIG. 10C, the upper and lower tape-engaging members 336, 338, respectively, define respective slots 342, which are oriented in a generally "V"-shaped array 344 (see also FIG. 11A), through which the concave configuration of the tape 142 may be guided.

Figure 10A:
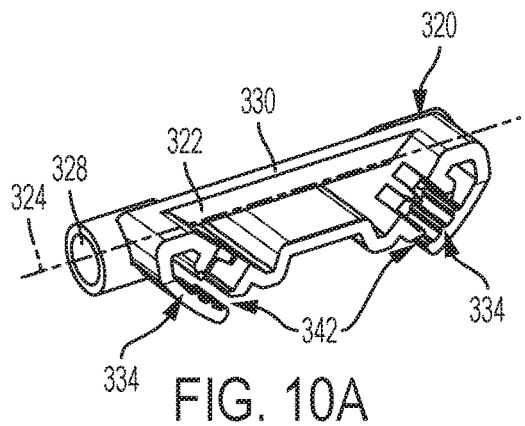
FIGS. 10A and 10B are enlarged perspective detail views, taken from the front and the rear, respectively, of the sensor holder of FIG. 7.
Figure 10B:
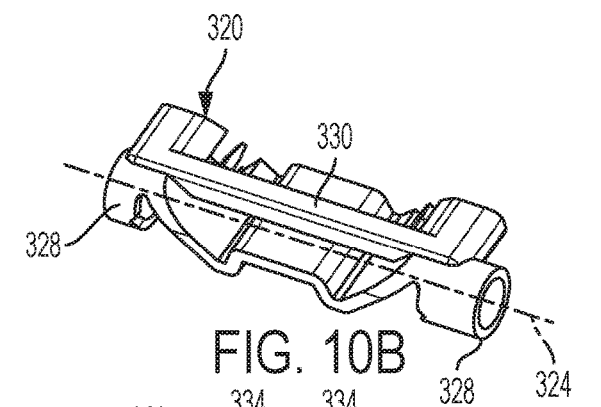
Figure 10C:
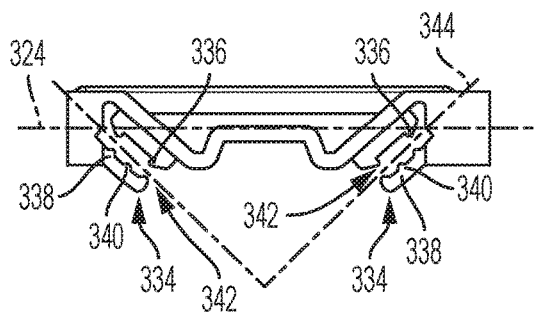
FIGS. 10C, 10D and 10E, and 10F and 10G are front elevational, left and right side elevational, and top and bottom plan views, respectively, of the sensor holder of FIGS. 10A and 10B.
Figure 10D:
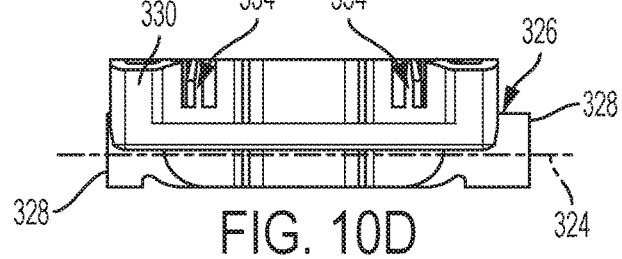
Figure 10E:
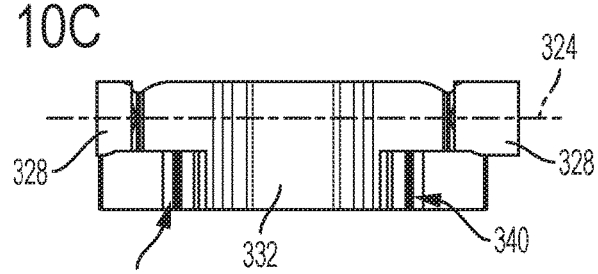
Figure 10F:
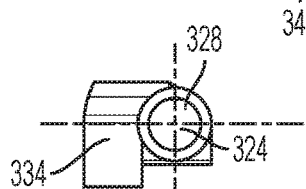
Figure 10G:
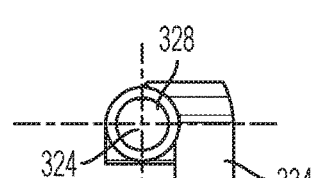
Figure 10H:
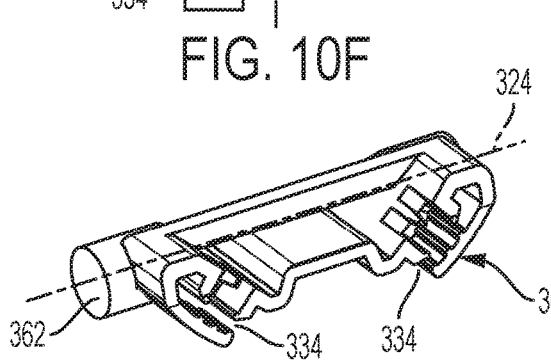
FIGS. 10H and 10I are enlarged perspective detail views, similar to those of FIGS. 10A and 10B, respectively, of another embodiment of a sensor holder, as used in the embodiment of the tape rule assembly of FIGS. 9A and 9B.
Figure 10I:
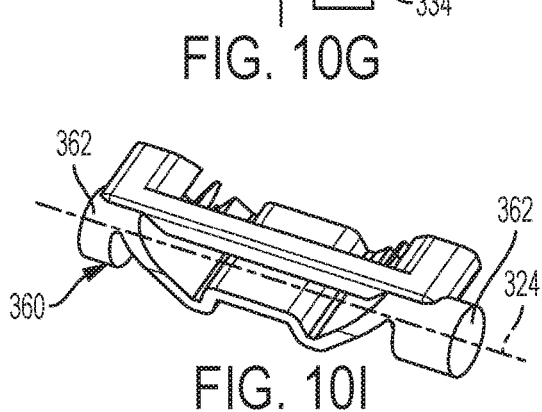

As shown in FIGS. 6-8, in an embodiment, the sensor holder 320 may be pivotably connected to the housing inwardly of the tape exit 116 via the aligned sensor holder mounting pegs or bosses 126 disposed in the left and right housing halves 112, 114, respectively, and which are slidably and rotatably engaged by respective tubular end portions 328 of the sensor holder body 322. In another embodiment, as shown in FIGS. 10H and 10I, a sensor holder 360 includes solid round bars or pegs 362 in place of the tubular end portions 328 of sensor holder 320. In all other respects, the sensor holder 360 is identical to sensor holder 320. Referring to FIGS. 9A and 9B, the sensor holder 360 is configured so that respective solid round bars or pegs 362 slidably engage respective aligned sensor holder mounting apertures or slots 128 formed in the left and right housing halves 112, 114.

Figure 11A:
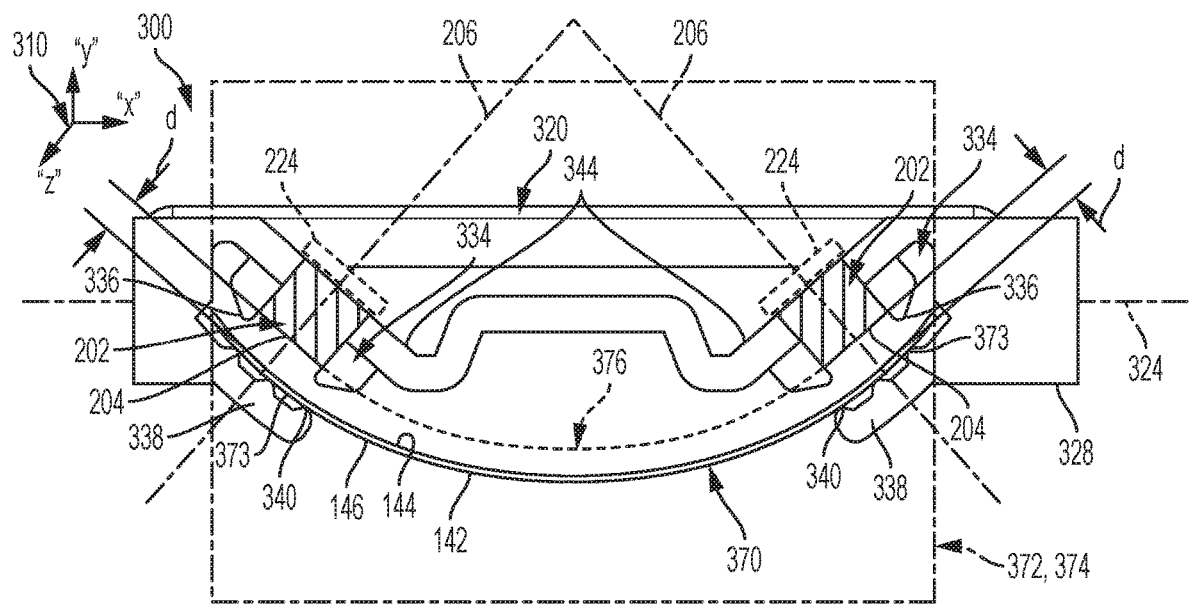
FIG. 11A is an enlarged schematic elevational detail view of the sensor holder, sensors, and tape of the tape rule assembly of FIG. 4, as taken from line 11A-11A of FIG. 8, with portions omitted for clarity.

The relationship among the tape 142 and the elements of the sensor holder 320 discussed above can be seen in FIGS. 8 and 11A. As the tape 142 is pulled off the reel 170, it passes through the slots 342 defined by the sensor holder 320, and then exits the housing 110 via the tape exit 116. Referring now to FIGS. 4 and 8, and to the set of intersecting Cartesian coordinates 310, the "x" and "y" axes define a first plane 312, which by definition is perpendicular to the "z" axis. With particular reference to FIG. 11A, the tape 142 has a first contour 370 in cross-section, the cross-section lying in a second plane 372 generally parallel to the first plane 312, as shown in FIG. 8. In an embodiment, the first contour 370 is concave relative to the housing 110, and includes a curved portion 373 proximate at least one of the sensor mounts 334 of the sensor holder 320, which, accordingly, is configured to substantially conform to the first contour. In other embodiments, the first contour 370 may be convex relative to the housing 110, may be rectilinear, or may be a composite of curved and rectilinear portions, or may be any shape which properly orients the optical sensor axes 204 of one or more optical sensors 202 relative to the tape 142.

Referring again to FIG. 11A, two optical sensors 202 may be disposed in respective sensor mounts 334 so that their respective optical sensor axes 206 are oriented generally perpendicular to the first contour 370 of the indicia surface 144 of the tape 142, proximate the sensor mounts. Ideally, in an embodiment, this would involve orienting each sensor axis 206 perpendicular to a tangent to respective curved portions 373 of the first contour 370 of the tape 142, the tangent being taken at the intersection of respective sensor axes 206 with respective curved portions 373. In other embodiments, the orientations of respective optical sensors 202 in the housing 110 may be dictated by the configurations of respective first contours 370.

The first function of the multi-function sensor holder system 300, to orient the optical sensors 202 so that their respective sensor axes 206 are perpendicular to the tracks 150, 156 of human-readable graduations of length 152, has therefore been achieved as set forth above. The second function, namely, to orient the optical sensors within the housing relative to one another via the sensor holder system 300, will be addressed by referring to FIGS. 11A, 16A-16D, and 17A-17D.

Referring again to FIG. 11A, it is readily apparent that, in an embodiment, the optical sensors 202 may be displaced relative to one another on the sensor holder 320 along the "x" axis (a set 310 of intersecting Cartesian coordinates "x", "y" and "z" having been provided with FIG. 11A for reference). The optical sensors 202 therefore are also displaced along the "x" axis in the housing 110. The amount of displacement along the "x" axis is dependent upon the relative locations of the human-readable graduations of length 152. Now referring to FIGS. 16A-16D, it can be seen that the optical sensor axes 206 (denoted by small circles on the parallel tracks 150, 156 of human-readable graduations of length 152) are also displaced on the sensor holder 320 relative to one another along the "z" axis by a distance "L". Consequently, the optical sensors 202 are displaced along the "z" axis relative to the housing 110 by a distance "L", as well. In an embodiment, the amount of displacement "L" along the "z" axis between the optical sensors 202 may be about one-half the distance between the centerlines of adjacent human-readable graduations of length 152. That means that if the centerlines of adjacent human-readable graduations of length 152 are separated by $\frac{1}{16}^{th}$ of an inch, the amount of displacement "L" along the "z" axis between the optical sensors 202 may be $\frac{1}{32}^{nd}$ of an inch. In other embodiments, the amounts of respective displacements along the "x" and "y" axes may be different. For example, if the first contour 370 were to assume a different shape, then the sensor holder system 300 would necessarily assume a conforming shape, which might then require different spatial relationships among the optical sensors 202.

In still further embodiments, in addition to, or in lieu of, being displaced with respect to one another and to the housing, as set forth above, the displacements of the optical sensors 202 may be further determined by their respective relationships to the human-readable graduations of length 152 disposed on the indicia surface 144 of the tape 142, which accordingly requires that the optical sensors also be oriented relative to the first contour 370. Referring to FIGS. 11A, 16A and 16B, in order to orient the optical sensors 202 relative to the tape 142, the optical sensors need to be displaced along a second contour 376 which is parallel to the first contour 370, requiring that the second contour also be disposed in a third plane 374 parallel to the first and second planes 312, 372, respectively (see FIG. 8). In an embodiment, the third plane 374 is coincident with the second plane 372. In other embodiments, the third plane 374 may be displaced along the "z" axis as is schematically shown for example in FIGS. 16B-16D, which means that the position of the third plane relative to the respective optical sensor axes 206 is also displaced along the "z" axis. In either event, the result is that if the optical sensors 202 are displaced generally along the second contour 376 within the third plane 374, the second contour 376 being parallel to the first contour 370, the optical sensors will still remain oriented perpendicular to the tape 142.

In FIGS. 16B-16D, the respective optical sensor axes 206 are shown schematically positioned to the right of the third plane 374. However, this magnified arrangement of the disposition of the sensor axes 206 is solely for illustrating the relative positions of the sensor axes 206 with respect to the tape 142. In reality, the sensor axes 206 lie substantially within the third plane 374 relative to the tape 142.

Another embodiment of the sensor holder system 300' is shown in FIGS. 17A-17D. Here, although two parallel tracks 150, 156 of human-readable graduations of length 152 are disposed on the tape 142, only one track 150 is being "read" by the linear optical encoder system 200. (This embodiment may also include, for example, a tape 142 with a single track 150 or 156.) In the embodiment of the sensor holder system 300', two optical sensors 202' may be configured to be smaller, as shown in FIG. 17A, so as to be able to read the same track 150 (or 156) of human-readable graduations of length 152. In an embodiment, the two optical sensors 202' may be disposed side-by-side in the same sensor mount 334 of a sensor holder 320' so that their respective optical sensor axes 206' are perpendicular to the tape 142. In other embodiments, the optical sensors 202 may be disposed elsewhere on the sensor holder 320, as long as they accurately read human-readable graduations of length 152. In either event, the optical sensors 202 may be displaced from one another along the "z" axis by a distance "L".

In further embodiments of the tape rule assembly 10, one or more tracks 150 may extend along the tape 142 along the "z" axis, but may be displaced along the "x" axis relative to the longitudinal edges 148 of the tape. In additional embodiments, there may be a plurality of tracks 150 disposed on the indicia surface 144 of the tape 142 both along the longitudinal edges 148, and along the "z" axis but displaced along the "x" axis relative to the longitudinal edges 148. In still further embodiments, one or more tracks 150 may be disposed as noted above, and/or on the lower surface 146 of the tape.

Having described how the sensor holder system 300 may achieve its second function, i.e., orienting the optical sensors 202 relative to one another, to the housing, and/or to the tape 142, it is now appropriate to describe how the sensor holder system may achieve its third function, namely, maintaining the distance "d" between the ends 204 of respective optical sensors 202 and the indicia surface 144 of the tape 142 within the critical range "R".

Figure 12A:
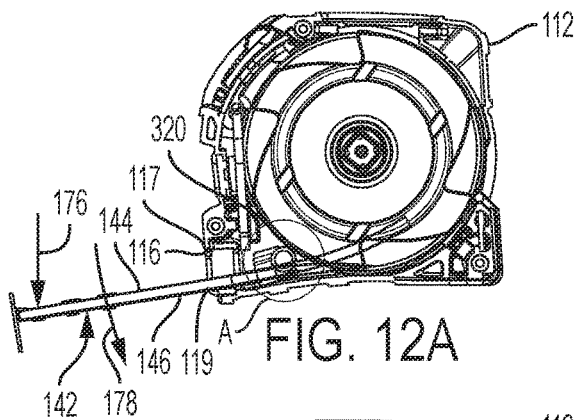
FIGS. 12A, 13A, 14A and 15A are progressive schematic side views, similar to that of FIG. 8, and illustrating the undulations of the tape interacting with both the housing and the sensor holder of the tape rule assembly of FIG. 4, the circled regions "A" schematically illustrating the respective orientations of the sensor holder of FIG. 7.
Figure 12B:
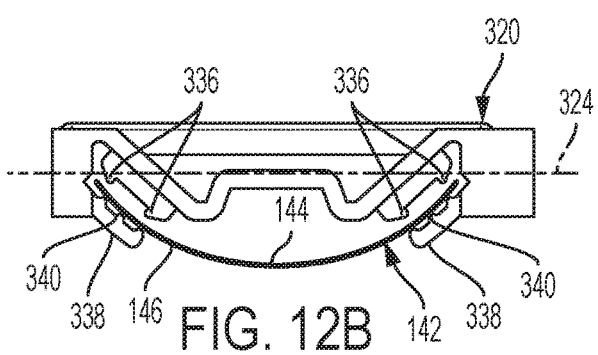
FIGS. 12B, 13B, 14B and 15B are schematic elevational detail views, similar to that of FIG. 11A, with portions removed for clarity, as viewed looking into the housing through the tape exits of FIGS. 12A, 13A, 14A and 15A, respectively.
Figure 13A:
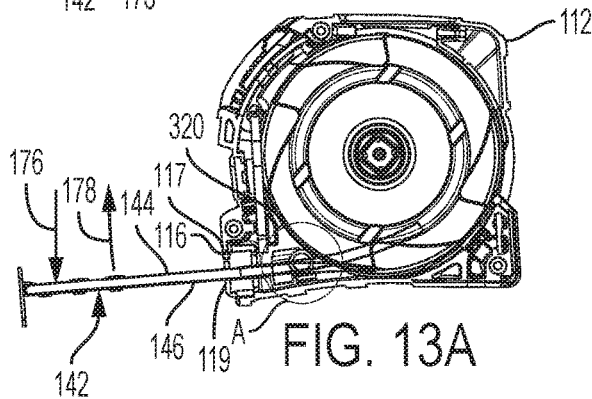
Figure 13B:
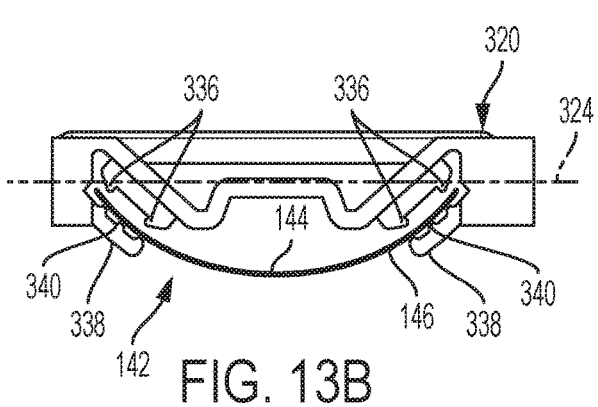

In a nutshell, the tape rule assembly 100 uses cooperation among the sensor holder 320, the housing 110, and the radial uncoiling bias 176 of the tape 142 itself to achieve this function. As shown schematically in FIGS. 7 and 8, FIG. 11A, and in FIGS. 12A-15B, a length of tape 142 is extended from the reel 170, along the housing inner surface 118, through the sensor holder slots 342, and out of the housing 110 via the tape exit 116. As the tape 142 is being extended, it is likely that undulations in the tape will cause it to move vertically up and down along the "y" axis, as shown for example by undulation arrows 178 in FIG. 8. Such undulations, unless effectively accommodated, would likely cause the distance "d" between the optical sensor ends 204 and the indicia surface 144 of the tape 142 to exceed the critical range "R", thereby degrading or eliminating the ability of the optical sensors 202 to read the human-readable graduations of length 152. In an embodiment, the sensor holder system 300 may accommodate the undulations by utilizing the uncoiling bias 176 to cause the tape 142 to continue to engage the ridges 340 of the lower tape-engaging members 338 of respective sensor holders 320, as the tape is extended from the housing 110. This condition is illustrated for example in FIGS. 13A and 13B. In an embodiment, another way in which the sensor holder system 300 may accommodate the undulations is to cause the sensor holder 320 to be pivotably mounted in the housing 110 as shown, for example in the circled region "A" of FIGS. 7 and 8. Therefore, if undulations cause the tape 142 to move downwardly relative to the position shown in FIGS. 13A and 13B, for example, the sensor holder 320 will also freely pivot downwardly with the tape, as shown in FIGS. 12A and 12B, until the lower surface 146 of the tape 142 engages a hard stop against the tape exit lower member 119, which accordingly provides a lower limit to the amount which the tape rule system 100 will allow the tape to move inside the housing 110.

Figure 14A:
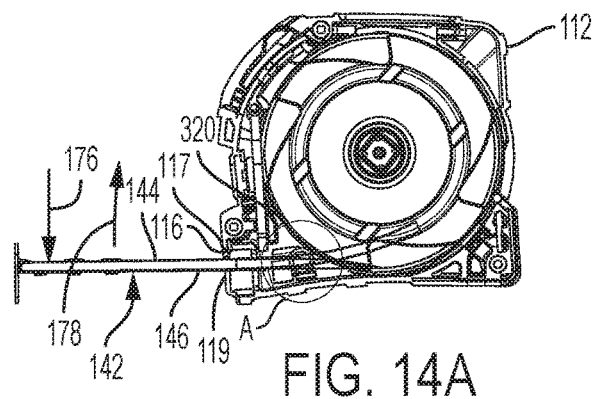
Figure 14B:
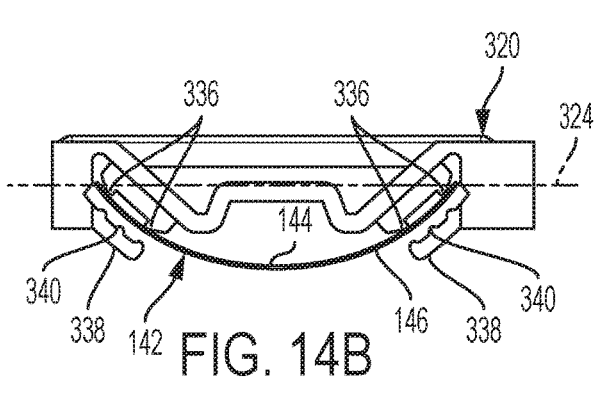
Figure 15A:
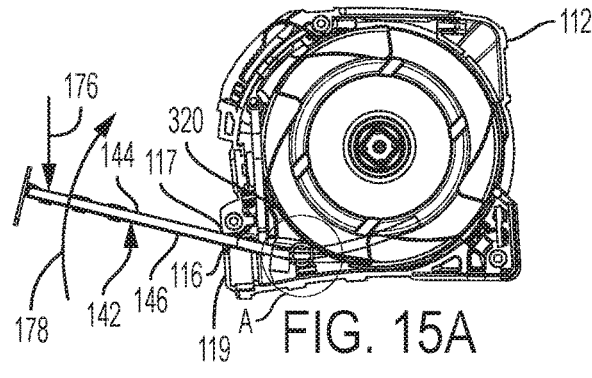
Figure 15B:
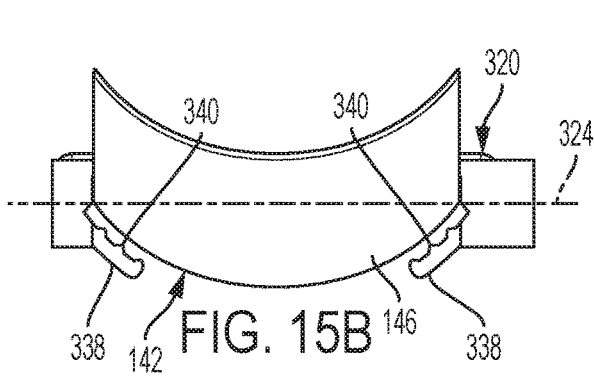

If, on the other hand, undulations in the tape 142 were to cause the tape to move upwardly, as shown in FIGS. 14A and 14B, then the tape would engage the upper tape-engaging members 336 of the sensor holders 320. Accordingly, inasmuch as the distance "d" between the upper tape engaging member 336 and the ridges 340 of the lower tape-engaging member is held to be substantially equal to "R", for the three conditions shown in FIG. 12A-14B, the uncoiling bias 176 of the tape 142 cooperates with the housing 110 and the sensor holder 320 to maintain the movement of the tape within the range "R". However, when an upward force of a vertical undulation in the tape 142 exceeds the downward uncoiling bias 176, as shown in FIGS. 15A and 15B, the sensor holder system 300 can still accommodate this undulation. In an embodiment, the sensor holder 320 may freely pivot upwardly until the indicia surface 144 of the tape 142 reaches a hard stop against the tape exit upper member 117, which accordingly provides an upper limit to the amount which the tape rule system 100 will allow the tape to move inside the housing 110.

In another embodiment, as shown in FIGS. 9A and 9B, a sensor holder 360 of FIGS. 10H and 10I may be disposed for sliding movement along sensor mounting aperture or slot 128 formed in the housing 110, instead of for pivotable movement, as described above. As schematically shown by the solid and phantom depictions of the sensor holder solid round bar 362 along the arrow shown in FIG. 9B, the result is the same as that achieved by the pivotable mounting arrangement, in that the coaction of the sensor holder 360 with the sensor mounting aperture or slot 128 permits the sensor holder to satisfactorily accommodate the upward and downward undulations in the tape 142.

Accordingly, the sensor holder system 300, in cooperation with the housing 110 and the uncoiling bias of the tape 176, provides a simple yet effective means for maintaining the distance "d" within the critical range "R", thereby achieving the third function as noted above, and without requiring rollers, springs or other elements as are typical in conventional systems.

The linear optical encoder system 200 will now be described in greater detail, with respect to FIGS. 7, 11A and 11B, 16A-16D, 17A-17D, and 18-23B.

Figure 11B:
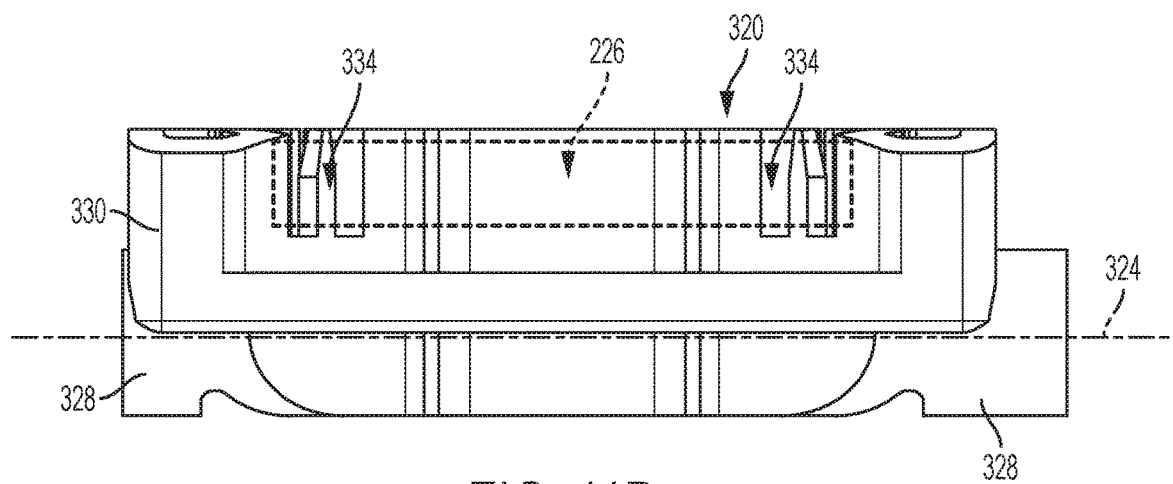
FIG. 11B is a schematic top plan view of the sensor holder and sensors of FIG. 11A.

As briefly outlined above, the outputs of respective optical sensors 202 are operatively connected to circuitry 210, which includes a main circuit board 212, as shown in FIG. 7, and one or more flexible circuit boards ("flex boards") 224, 226, respectively, which are electrically connected to the main circuit board. From a structural standpoint, in an embodiment, the main circuit board 212 is configured as a disk on which are mounted various elements of the circuitry 210. In other embodiments, elements of the circuitry 210 may be mounted elsewhere within or on the housing 110, and with various configurations. As schematically shown in FIG. 11A, the outputs of sensors 202 may be provided to the flex board 224, which may be disposed on an upper surface of the sensor holder 320. In the embodiment shown in FIG. 11A, a separate flex board 224 may be provided for each optical sensor 202. However, in another embodiment, as shown in FIG. 11B, a single elongated flex board 226 may be disposed on the sensor holder 320 and electrically connected to the optical sensors 202. The flexibility and thin profiles of flex boards 224, 226 make them particularly suitable for mounting on the relatively small sensor holder 320, but it will be appreciated that in other embodiments, the circuitry of the flex boards may be disposed elsewhere on the sensor holder, or, for example, the flex board circuitry may be included on the main circuit board 212.

Figure 18:
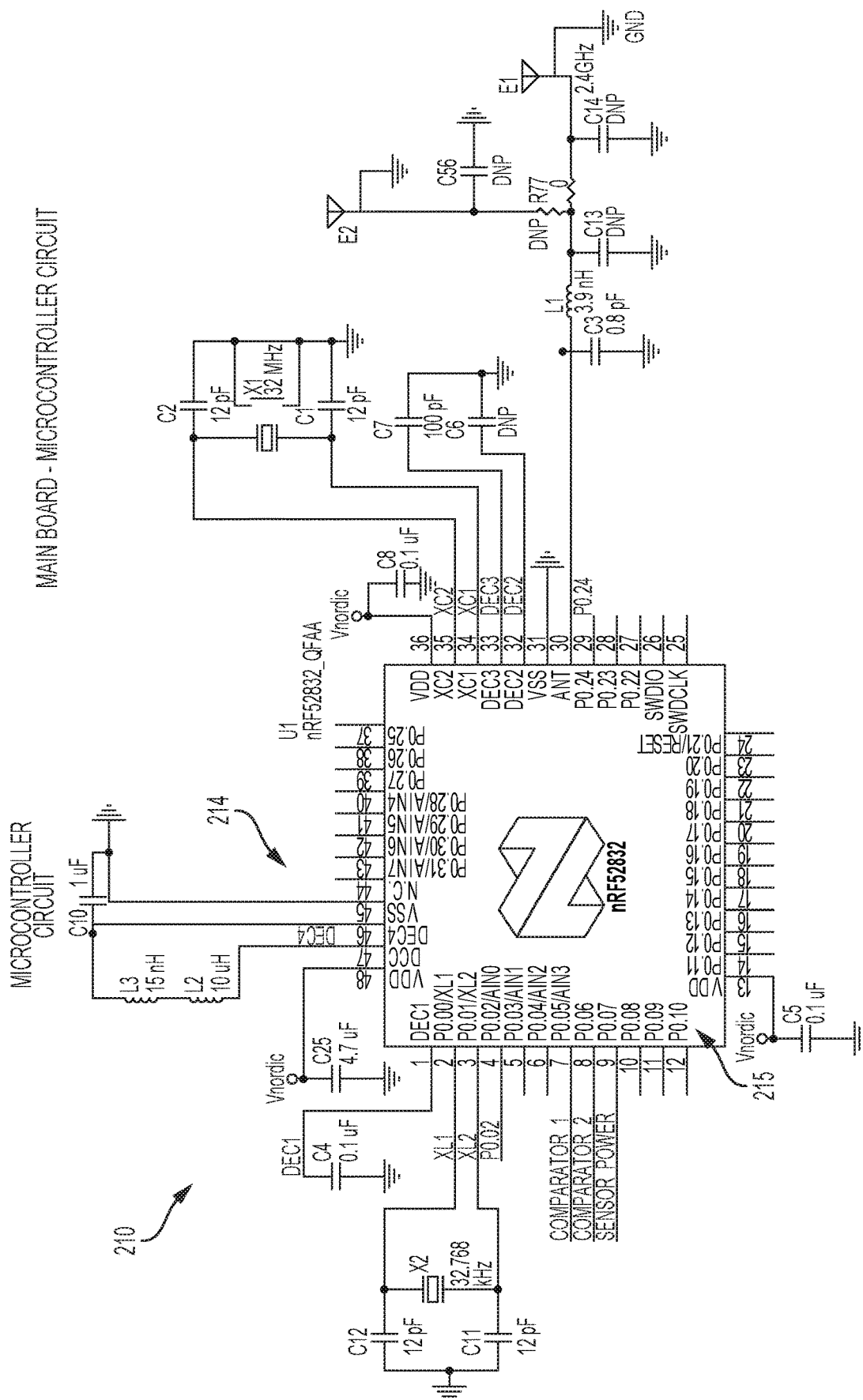
FIG. 18 is a circuit diagram including a microcontroller of a main circuit board of the tape rule assembly of FIG. 4.
Figure 19:
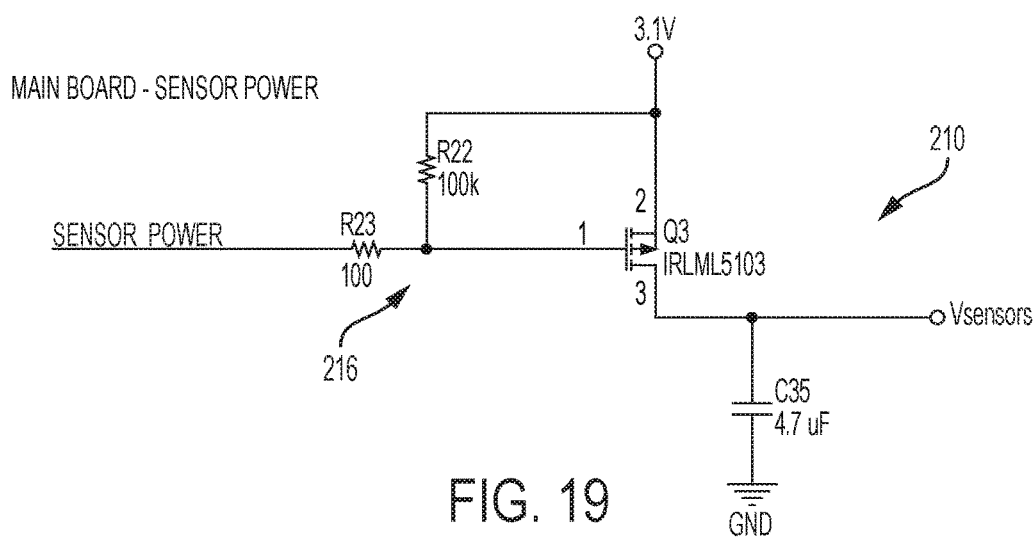
FIG. 19 is a circuit diagram of a sensor power circuit of the main circuit board of FIG. 18.
Figure 20:
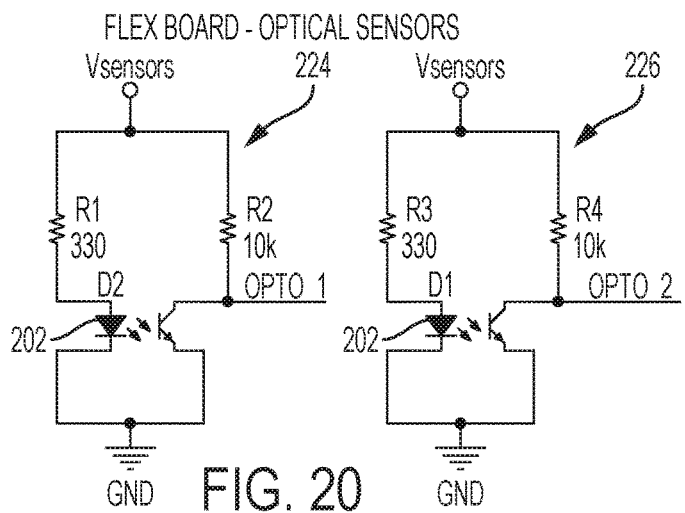
FIG. 20 is a circuit diagram of flexible circuit board(s) for the optical sensors of the tape rule assembly of FIG. 4.

The electrical interconnection among the elements of the circuitry 210 is illustrated in FIGS. 18-21. The main circuit board 212 may include a microcontroller or processor circuit 214, a sensor power circuit 216, and a comparator circuit 218. As shown in FIG. 18, the microcontroller circuit 214 may include a Nordic nRF52832 system-on-a-chip ("SoC") or integrated circuit 215. In other embodiments, the microcontroller circuit 214 may include one or more microcontrollers or microprocessors having greater or less functionality than the Nordic SoC shown in FIG. 18. As shown in FIGS. 19 and 20, the sensor power circuit 216 may be operatively connected to the microcontroller circuit 214 and may provide power to the optical sensors 202 via the flex boards 224, 226.

Figure 21:
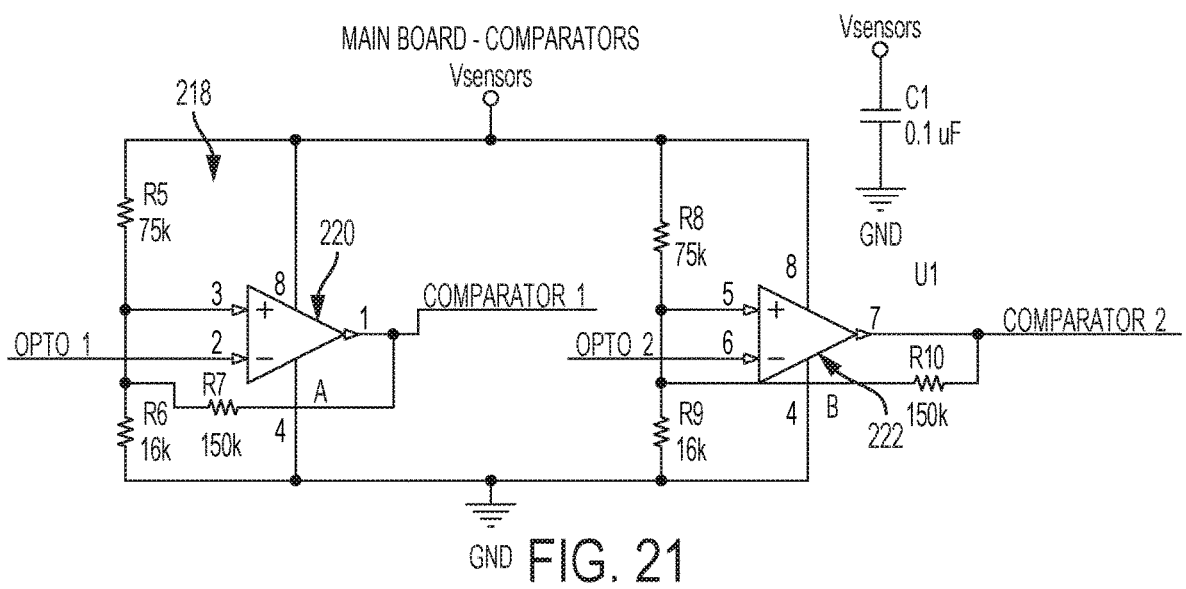
FIG. 21 is a circuit diagram of the comparators of the main circuit board of FIG. 18.

The comparator circuit 218 may include comparators 220, 222, which are designated "COMPARATOR 1" and "COMPARATOR 2", respectively. Comparators 220, 222 may be, for example, STMicroelectronics TS3702CDT IC comparators, but in other embodiments, may be any other suitable comparators, whether configured as integrated circuits or as separate components. As shown in FIGS. 20 and 21, the outputs of the optical sensors 202 are operatively connected to the comparators 220, 222, respectively, in the comparator circuit 218. Furthermore, in an embodiment, the comparator circuit 218 may be configured as a Schmitt trigger, but in other embodiments, the comparator circuit may have several acceptable configurations. Configuring the comparator circuit 218 as a Schmitt trigger provides hysteresis, so that the respective comparator outputs will not toggle rapidly while optical sensors 202 are transitioning from light to dark ("white" to "black") regions of the first and second tracks 150, 156, respectively, on the tape 142 (see FIGS. 16B-16D and 17B-17D).

As shown in FIG. 18, the outputs of comparators 220 and 222 may be provided to the microcontroller circuit 214. In response to being energized by the switch 230 (FIG. 4), which may be operatively connected to the microcontroller circuit 214, the output(s) of the microcontroller circuit 214 may be operatively provided or transmitted to the digital display device 240, whether the digital display device is mounted on the housing 110, or is in a remote location. In an embodiment, the digital display device 240 may include an LCD, which may display both the instantaneous and cumulative length of tape 142 being extended from the tape rule assembly 100, as well as information as to whether the length is being displayed in Imperial units of measurement or in units of the metric system. In other embodiments, the digital display device 240 may take any suitable configuration, may display any item or combinations of items of information, and may wirelessly communicate with the microcontroller circuit 214, for example, via Bluetooth® technology.

Figure 22:
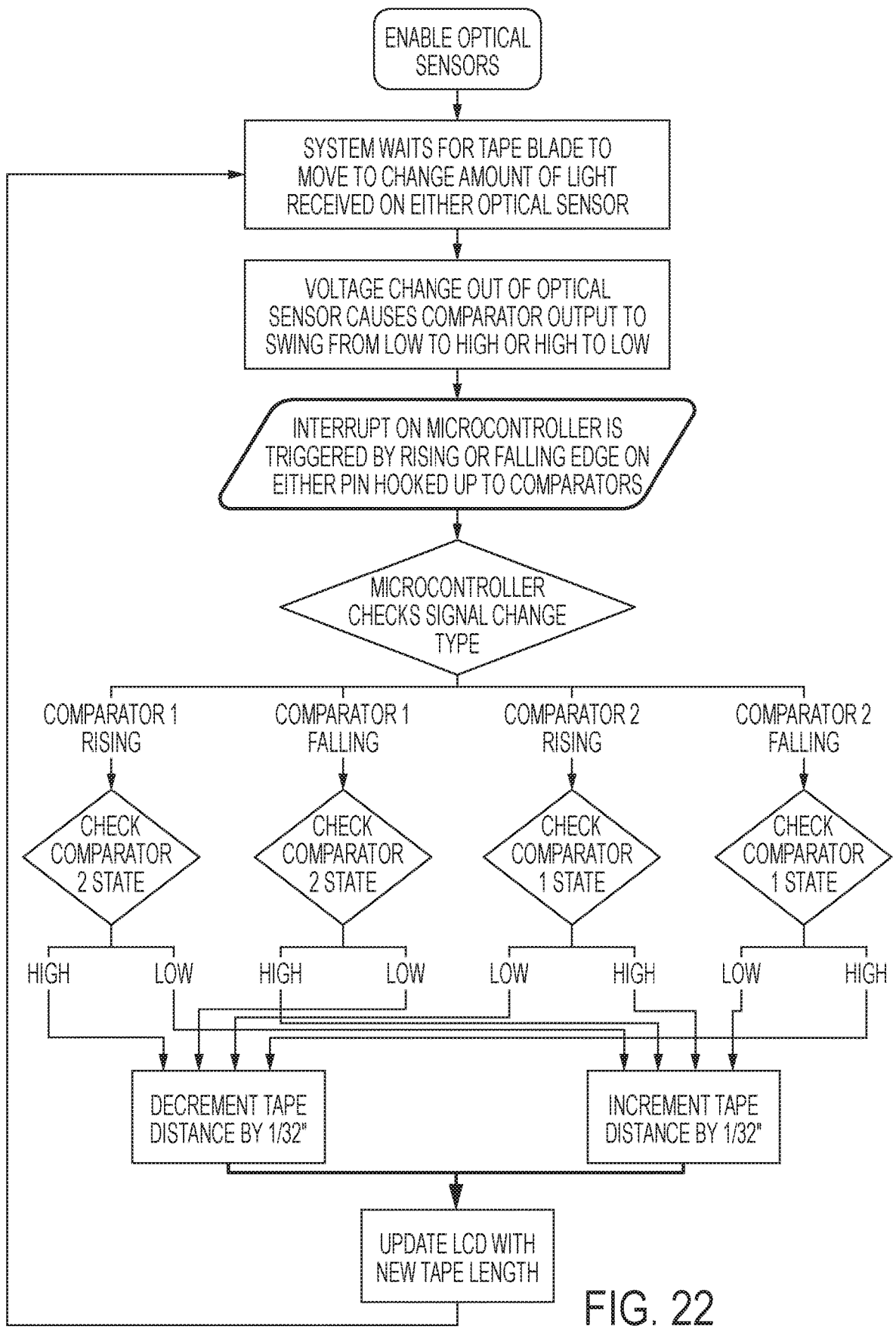
FIG. 22 is a flow chart illustrating a process according to the present invention for using the human-readable graduations of length disposed on a surface of a tape to calculate the length of tape being extended from the tape housing.
Figures 23A, 23B:
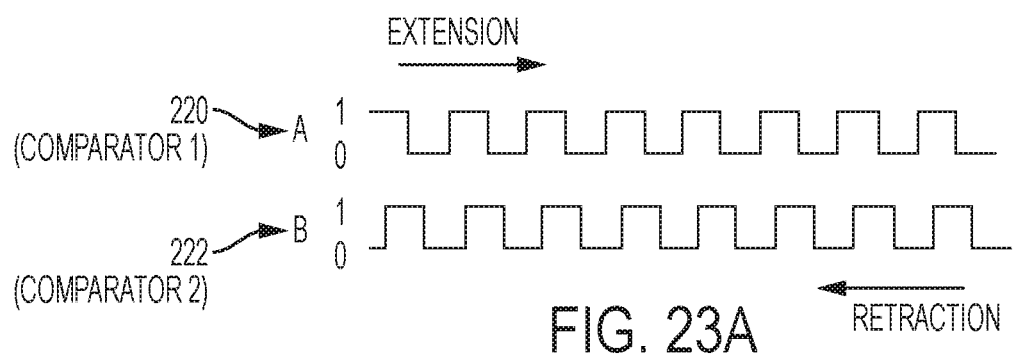
FIG. 23A illustrates the respective outputs from comparators 1 and 2 of FIG. 21 of the tape rule assembly of FIG. 4.
FIG. 23B is a table of results as a microcontroller of the tape rule assembly of FIG. 4 evaluates the outputs of the comparators of FIG. 23A.

Moving now to the operation of the circuitry 210, and referring to FIGS. 22, 23A and 23B, as well as to FIGS. 18-21, the measuring process begins when an operator energizes the switch 230, which causes the microcontroller 215 to turn on the infrared LEDs embedded in the optical sensors 202. The optical sensors can then start outputting a voltage that corresponds to how much of the infrared light which is transmitted to the tracks 150, 156 of the tape 142, is then received by their respective internal phototransistors. When the maximum amount of light is received by an optical sensor 202, the output of the optical sensor may be a low-voltage of about 0.2 volts. When no light is received, the output of the optical sensor 202 becomes equal to its ("high") supply voltage, which, in an embodiment, may be about 3.15 volts. In an embodiment, the trigger thresholds of the Schmitt triggers may be tuned to the particular configuration of the tape rule assembly 10. Also, in an embodiment, the low trip point may be set for about 0.45 volts, and the high trip point may be set for 0.55 volts. As the voltage falls during the transition from dark to light on the tape 142, the respective outputs of the comparators 220, 222 will therefore not change until the voltage is below 0.45 volts.

Meanwhile, the outputs of the comparators 220, 222 are being constantly monitored by the microcontroller 215. Each comparator output is connected to its own pin on the microcontroller 215. The firmware on the microcontroller 215 initializes each of these pins as general purpose input/outputs with interrupts that may be triggered on either a rising or falling edge of the comparator output signal. Each time there is a light-to-dark, or dark-to-light transition, the microcontroller 215 enters its interrupt service routine. The microcontroller 215 checks which pin and which type of edge caused the interrupt surface routine to fire. The microcontroller 215 then checks the status of the other pin, seeing whether it is at a high or low voltage. Based on this information, the microcontroller 215 may then increment or decrement, respectively, the measurement of the total amount of distance that the tape has been extended.

This process is illustrated in more detail with reference to the waveforms "A" and "B" of comparators 1 and 2, respectively, of FIG. 23A, and to the table of results shown in FIG. 23B. Referring to the first event in the case of the tape 142 being extended, (which is simulated by viewing the waveforms "A" and "B" beginning on the left of FIG. 23A), the microcontroller 215 has detected a rising signal "B" from comparator 2. It then checks the status of the other pin, which reveals that signal "A" is high. Therefore the distance measured by the tape 142 is incremented in the microcontroller 215. The next event in time "t" is a falling edge on signal "A". However, inasmuch as signal "B" is still high, the distance is again incremented. The next event is a falling edge on signal "B". Because signal "A" is low at that point, the distance measurement in the microcontroller 215 is again incremented. As the tape 142 continues to be extended, the next event is a rising edge on signal "A", and inasmuch as signal "B" is low at that point, the distance measured in the microcontroller 215 is incremented yet again.

In the case in which the tape 142 is being retracted, on the other hand, (simulated by viewing the waveforms "A" and "B" of FIG. 23A beginning on the right of FIG. 23A), now the first event in time that the microcontroller 215 detects is a rising edge on signal "B". The microcontroller 215 then checks the status of the other pin (signal "A"), which is revealed to be low. Therefore the microcontroller 215 decrements the distance that is being measured. Moving from left to right, the next event that is detected is a rising "A" signal coupled with a high "B" signal. The microcontroller 215 accordingly once again decrements the distance that is being measured. As can be seen, as the waveforms of FIG. 23A are viewed from left to right in time, the microcontroller 215 continues to decrement the distance that is being measured.

Note that in the linear optical encoder system 200 described above, only four different cases or combinations of comparator output states will occur when the tape rule assembly 100 is extending; and only four different cases or combinations of comparator output states will occur when the tape rule assembly 100 is retracting. This is in contrast to the more complex requirements of conventional linear encoding systems used in conjunction with conventional tape rules.

After each step of the processes set forth above has been completed, the microcontroller 215 then checks whether the plate 120 is engaged. If so, that means the tape rule assembly 100 is being pressed into a corner to take an inside measurement, so that the width of the tape rule housing 110 is added to the measurement being determined by the linear optical encoder system 200. The microcontroller 215 checks which units of measurement the operator has previously selected, whether it is metric, Imperial in fractional inches and feet, Imperial in all fractional inches with no feet, and/or Imperial with all decimal inches. This value may be displayed on the LCD to inform the operator what the current measurement of distance may be. At that point, the switch 230 may again be engaged to record the current measurement. The measurement is then stored in a flash memory chip on the main circuit board 212. In an embodiment, the microcontroller 215 may have an embedded Bluetooth® low-energy radio that can then send all recorded measurements to a mobile phone or computer that has Bluetooth® low-energy communication abilities. In additional embodiments, buttons may be disposed on the tape measure housing 110 itself to cause the LCD to scroll through previous measurements. In further embodiments, the tape rule assembly 100 also may have the ability to perform an audio description of the measurement, as an operator speaks into the tape rule housing 110 after the measurement is taken. This audio recording may be sent to a mobile phone or computer along with the measurement. The audio may also be sent to the cloud for voice-to-text translation, so that an application on a phone or computer can show the value of the measurement along with an audio description of what was being measured.

It can thus be seen that the various embodiments of the tape rule assemblies 100 of the present invention described above provide digital tape rules which use a linear optical encoder that senses human-readable graduations of length, without requiring that machine-readable indicia also be present on the tape, and which uses a simple but effective means for maintaining the distance between the optical sensors and the tape surface within the critical range, notwithstanding undulations in the tape as the tape is extended from the housing.

While the present invention has been described with respect to various embodiments of a tape rule assembly, the present invention may be further modified within the spirit and scope of this disclosure to apply to other products as well. This Application is therefore intended to cover any variations, uses, or adaptations of the present invention using its general principles. The accompanying Drawings illustrate exemplary embodiments of the artist invention. Alternative embodiments, examples, and modifications which would still be encompassed by the invention may be made by those skilled in the art, particularly in light of the foregoing teachings. The examples and alternative embodiments described above may be combined in a variety of ways with each other. Further, the steps and number of the various steps illustrated in the figures may be adjusted from that shown. Furthermore, this Application is intended to cover such departures from the present disclosure as come within known or customary practices in the art to which this invention pertains and which fall within the limitations of the appended claims. Those skilled in the art should now appreciate that various adaptations and modifications of the examples and alternative embodiments described above can be configured without departing from the scope and spirit of the invention. Therefore, it is to be understood that, within the scope of the appended claims, the invention may be practiced other than as specifically described herein.

What is claimed is:

1. A tape rule assembly, comprising:
   a housing having a tape exit, wherein intersecting "x", "y" and "z" axes are defined relative to the tape exit;
   a length of tape disposed in the housing and having a surface, and further being extendable from the housing along the "z" axis;
   a first plurality of human-readable graduations of length disposed on the surface of the length of tape; and
   a linear optical encoder system disposed in the housing and operatively associated with the first human-readable graduations of length to provide an output representative of the length of tape extended from the housing;
   wherein the linear optical encoder system includes two optical sensors;
   the two optical sensors are displaced relative to each other in the housing along both the "x" axis and the "z" axis; and
   wherein the two optical sensors are configured to sense the first plurality of human-readable graduations of length.

2. The tape rule assembly claimed in claim 1, wherein:
   the "x" axis and the "y" axis define a first plane generally transverse to the "z" axis;
   the tape has a contour in cross-section, the cross-section lying in a second plane parallel to the first plane;
   the housing includes a housing member configured to substantially conform to the contour of the tape; and
   wherein the optical sensors are disposed on the housing member.

3. The tape rule assembly claimed in claim 2, wherein the housing member, the housing, the tape, and the optical sensors are configured to cooperate to maintain a distance "d" between an end of at least one of the optical sensors and the surface of the tape within an acceptable range of distances "R".

4. The tape rule assembly claimed in claim 2, wherein the contour of the tape proximate an end of at least one of the optical sensors includes a curved portion.

5. The tape rule assembly claimed in claim 1, wherein:
the "x" axis and the "y" axis define a first plane generally transverse to the "z" axis;
the tape having a first contour in cross-section, the cross-section lying in a second plane generally parallel to the first plane;
wherein the two optical sensors are also displaced in the housing relative to the tape along a second contour lying in a third plane generally parallel to the second plane, the second contour being substantially parallel to the first contour; and
wherein the two optical sensors are further displaced in the housing along the "z" axis relative to the tape.

6. The tape rule assembly claimed in claim 5, wherein the contour of the tape proximate an end of at least one of the optical sensors includes a curved portion.

7. The tape rule assembly claimed in claim 6, wherein the optical sensors are displaced along the "z" axis relative to the tape about one-half the distance between the centerlines of adjacent graduations of length.

8. The tape rule assembly claimed in claim 7, wherein the optical sensors are displaced along the "z" axis relative to the tape about 1/32 of an inch.

9. The tape rule assembly claimed in claim 6, further comprising:
a second plurality of human-readable graduations of length disposed on the surface of the length of tape;
wherein one of the optical sensors is configured to sense the first plurality of human-readable graduations of length, and the other of the optical sensors is configured to sense the second plurality of human-readable graduations of length.

10. The tape rule assembly claimed in claim 9, wherein:
the first plurality of human-readable graduations of length define a first track, and the second plurality of human readable graduations of length define a second track; and
wherein the graduations of length of the second track are not axially displaced relative to the graduations of length of the first track.

11. The tape rule assembly claimed in claim 1, wherein:
the tape includes two longitudinal edges;
the first plurality of human-readable graduations of length are disposed proximate one of the longitudinal edges of the tape;
the outputs of the optical sensors are provided to comparators in the linear optical encoder system;
respective outputs of the comparators are provided to a microcontroller; and
wherein an output of the microcontroller is provided to a digital display device.

12. The tape rule assembly claimed in claim 11, wherein, other than the human-readable graduations of length readable by the linear optical encoder system disposed in the housing, there are no machine-readable indicia of length disposed on the surface of the tape.

13. A method of measuring a length of tape extended from a tape rule housing having a tape exit, wherein intersecting "x" and "y" axes are defined relative to the tape exit, and wherein a surface of the tape bears human-readable graduations of length, comprising:
extending a length of tape from the tape exit along a "z" axis so that two optical sensors of a linear optical encoder system sense the human-readable graduations of length as the tape is being extended, the two optical sensors being disposed in the housing and being displaced from one another along both the "x" axis and the "z" axis; and
using the output of the two optical sensors to provide a display of the length of tape extended from the housing.

14. The method claimed in claim 13, wherein:
two parallel tracks, each containing human-readable graduations of length and numbers associated with the human-readable graduations of length, are disposed on the surface of the tape;
each track is disposed proximate a longitudinal edge of the tape; and
wherein one optical sensor is configured to sense one track, and the other optical sensor is configured to sense the other track.

15. A tape rule assembly including a housing, comprising:
a length of tape disposed in the housing and coiled about a reel, the housing configured to confine the tape in a coiled state, the length of tape being extendable from the housing;
wherein the length of tape is configured to uncoil if unconfined to produce a radial uncoiling bias;
the length of tape includes an indicia surface on which are disposed indicia of length, the length of tape further includes a lower surface; and
wherein the radial uncoiling bias produces a force biasing the lower surface of the tape against an inner surface of the housing as the tape is extended from the housing; and further comprising:
a linear optical encoder system;
a first optical sensor operatively associated with the linear optical encoder system; and
a sensor holder disposed in the housing and configured to hold the first optical sensor relative to the tape so that the first optical sensor can sense the indicia surface;
wherein the first optical sensor includes a sensor end disposed a distance "d" from the tape indicia surface; and
wherein the housing, the sensor holder, and the uncoiling bias of the tape are configured to cooperate to maintain the distance "d" within an acceptable range of distances "R", notwithstanding undulations in the tape as the tape is extended from the housing, and without requiring rollers or springs to assist in urging the lower surface of the tape against the inner surface of the housing;
the housing defines a recess; and
wherein the sensor holder includes a member movable in the recess, and is configured to move via the recess responsive to undulations in the tape as the tape is extended from the housing to cooperate with the housing and the uncoiling bias of the tape to maintain the distance "d" within the acceptable range of distances "R".

16. A tape rule assembly including a housing, comprising:
a length of tape disposed in the housing and coiled about a reel, the housing configured to confine the tape in a coiled state, the length of tape being extendable from the housing;
wherein the length of tape is configured to uncoil if unconfined to produce a radial uncoiling bias;
the length of tape includes an indicia surface on which are disposed indicia of length, the length of tape further includes a lower surface; and wherein the radial uncoiling bias produces a force biasing the lower surface of the tape against an inner surface of the housing as the tape is extended from the housing; and further comprising:

a linear optical encoder system;

a first optical sensor operatively associated with the linear optical encoder system; and a sensor holder disposed in the housing and configured to hold the first optical sensor relative to the tape so that the first optical sensor can sense the indicia surface;

wherein the first optical sensor includes a sensor end disposed a distance "d" from the tape indicia surface;

wherein the housing, the sensor holder, and the uncoiling bias of the tape are configured to cooperate to maintain the distance "d" within an acceptable range of distances "R", notwithstanding undulations in the tape as the tape is extended from the housing, and without requiring rollers or springs to assist in urging the lower surface of the tape against the inner surface of the housing; and wherein the sensor holder is pivotably disposed in the housing about a horizontal pivot axis and is configured to pivot responsive to undulations in the tape as the tape is extended from the housing to cooperate with the housing and the uncoiling bias of the tape to maintain the distance "d" within the acceptable range of distances "R".

17. The tape rule assembly claimed in claim 16, further comprising:

a second optical sensor operatively associated with the linear optical encoder system;

wherein two parallel tracks of indicia are disposed on the tape indicia surface;

the sensor holder is configured to orient the first and second optical sensors relative to the tape so that each optical sensor can read a respective track of the two tracks of indicia;

the sensor holder further includes two sets of upper and lower tape-engaging members, each tape-engaging member operatively associated with a respective optical sensor;

each lower tape-engaging member is biased into engagement with the lower surface of the tape by the force of the uncoiling bias of the tape;

each upper tape-engaging member is configured to engage the indicia surface of the tape when the undulations of the tape cause the tape to exert a force greater than, and opposed to, the force exerted by the uncoiling bias of the tape;

the distance between respective upper and lower tape-engaging members is substantially equal to "R"; and wherein "R" is from about 0.5 mm to about 1.2 mm.

18. The tape rule assembly claimed in claim 17, wherein:

the housing includes a tape exit, wherein intersecting "x" and "y" axes are defined relative to the tape exit;

the tape includes two parallel longitudinal edges;

as viewed from the tape exit and looking into the housing, the two sets of tape-engaging members form slots through which travel respective longitudinal edges of the tape as the tape is extended from the tape exit along a "z" axis, so that the respective slots form a generally "V"-shaped array;

the sensor holder is formed as a single unitary body;

each lower tape-engaging member defines a respective plurality of ridges engaging the lower surface of the tape to reduce friction between the tape and the lower tape-engaging members; and wherein the optical sensors and the sensor holder are configured so that the sensors are displaced both along the "x" axis and along the "z" axis relative to each other and to the tape exit.

19. The tape rule assembly claimed in claim 17, wherein:

the two tracks of indicia include human-readable graduations of length; and wherein the sensor holder is configured so that the optical sensors can read the human-readable graduations of length and provide the readings to the linear optical encoder system.

* * * * *